(12) United States Patent
Arnaudov et al.

(10) Patent No.: US 10,368,565 B2
(45) Date of Patent: *Aug. 6, 2019

(54) DRY MIXTURE IN PARTICULATE FORM FOR PREPARATION OF LIQUID FOODS WITH DISPERSED GAS BUBBLES

(71) Applicants: Luben Nikolaev Arnaudov, Spijkenisse (NL); Albert Thijs Poortinga, Apeldoorn (NL); Paul Bastiaan van Seeventer, Meppel (NL); Simeon Dobrev Stoyanov, Spijkenisse (NL)

(72) Inventors: Luben Nikolaev Arnaudov, Spijkenisse (NL); Albert Thijs Poortinga, Apeldoorn (NL); Paul Bastiaan van Seeventer, Meppel (NL); Simeon Dobrev Stoyanov, Spijkenisse (NL)

(73) Assignee: Conopco, Inc., Englewood Cliffs, NJ (US)

( * ) Notice: Subject to any disclaimer, the term of this patent is extended or adjusted under 35 U.S.C. 154(b) by 101 days.

This patent is subject to a terminal disclaimer.

(21) Appl. No.: 15/729,385

(22) Filed: Oct. 10, 2017

(65) Prior Publication Data

US 2018/0027846 A1 Feb. 1, 2018

(51) Int. Cl.
| | | |
|---|---|---|
| *A23L 2/54* | (2006.01) | |
| *A23P 10/47* | (2016.01) | |
| *A23P 30/40* | (2016.01) | |
| *A23L 29/269* | (2016.01) | |
| *A23L 2/39* | (2006.01) | |

(Continued)

(52) U.S. Cl.
CPC .................. *A23L 2/54* (2013.01); *A23G 9/52* (2013.01); *A23L 2/39* (2013.01); *A23L 23/00* (2016.08); *A23L 29/27* (2016.08); *A23P 10/47* (2016.08); *A23P 30/40* (2016.08); *A23V 2002/00* (2013.01)

(58) Field of Classification Search
CPC .... A23L 2/54; A23L 29/27; A23L 2/39; A23P 10/47; A23P 30/40
See application file for complete search history.

(56) References Cited

U.S. PATENT DOCUMENTS

| | | |
|---|---|---|
| 4,438,147 A | 3/1984 | Hedrick, Jr. |
| 5,350,591 A | 9/1994 | Canton |

(Continued)

FOREIGN PATENT DOCUMENTS

| | | |
|---|---|---|
| EP | 458310 | 11/1991 |
| EP | 1529447 | 5/2005 |

(Continued)

OTHER PUBLICATIONS

IPRP in PCTEP2014071377, Nov. 3, 2015.

(Continued)

*Primary Examiner* — Katherine D Leblanc
(74) *Attorney, Agent, or Firm* — Greenberg Traurig, LLP

(57) ABSTRACT

The present invention provides a dry mixture in particulate form containing a gas release agent, a flavor component and a hydrocolloid. Upon dissolution in water, gas bubbles are released into the continuous liquid phase, and these bubbles remain dispersed in the continuous liquid phase. These dry mixes can be used for preparation of ice cream and/or desserts and/or milk shakes.

16 Claims, 7 Drawing Sheets

(51) Int. Cl.
*A23G 9/52* (2006.01)
*A23L 23/00* (2016.01)

(56) References Cited

U.S. PATENT DOCUMENTS

| | | | |
|---|---|---|---|
| 6,129,943 | A | 10/2000 | Zeller et al. |
| 6,180,159 | B1 | 1/2001 | Villagran et al. |
| 6,953,592 | B2 | 10/2005 | Darbyshire et al. |
| 9,005,690 | B2 * | 4/2015 | Aldred ................ A23C 9/1544 426/329 |
| 2005/0214429 | A1 | 9/2005 | Anderson et al. |
| 2006/0062883 | A1 * | 3/2006 | Hanselmann ........... A23P 30/40 426/564 |
| 2006/0204642 | A1 | 9/2006 | Adams et al. |
| 2007/0059362 | A1 | 3/2007 | Rau |
| 2009/0053367 | A1 | 2/2009 | Kulisch |
| 2011/0008514 | A1 | 1/2011 | Spelman et al. |
| 2012/0021106 | A1 * | 1/2012 | Burmester ........... A23C 9/1524 426/327 |
| 2012/0053339 | A1 * | 3/2012 | Clark ....................... C12R 1/64 536/114 |

FOREIGN PATENT DOCUMENTS

| | | |
|---|---|---|
| EP | 1799048 A1 | 6/2007 |
| EP | 1627572 B1 | 7/2009 |
| EP | 1633211 B1 | 6/2010 |
| EP | 1627568 B1 | 6/2011 |
| EP | 1505879 | 11/2011 |
| EP | 2086341 B1 | 11/2012 |
| EP | 1791438 B2 | 7/2014 |
| EP | 2413707 B1 | 6/2015 |
| JP | 8322502 | 12/1996 |
| WO | WO0108504 | 2/2001 |
| WO | WO02087400 | 11/2002 |
| WO | WO03055332 | 7/2003 |
| WO | WO2004019699 | 3/2004 |
| WO | WO2006023564 | 3/2006 |
| WO | WO2006023565 | 3/2006 |
| WO | WO2007039064 | 4/2007 |
| WO | WO2008036744 | 3/2008 |
| WO | WO2008074606 | 6/2008 |
| WO | WO2009024200 | 2/2009 |
| WO | WO2009040249 | 4/2009 |
| WO | WO2010005297 | 1/2010 |
| WO | WO-2010005297 A1 * | 1/2010 ............. A23C 11/04 |
| WO | WO2010071425 | 6/2010 |
| WO | WO2012030651 | 3/2012 |
| WO | WO2012068012 | 5/2012 |
| WO | WO2012082897 | 6/2012 |
| WO | WO2013034520 | 3/2013 |

OTHER PUBLICATIONS

Nguyen et al., Effect of raw material and processing factors on the production of effervescent artichoke (*Cynara scolymus* L ) tea tablets, International Journal of Food Engineering, Jan. 1, 2011, pp. 1-15, v. 7, No. 1, VN.
Search Report and Written Opinion in EP13187672, dated Jan. 2, 2014.
Search Report and Written Opinion in EP17186024, dated Nov. 28, 2017.
Search Report and Written Opinion in PCTEPP2014071377, dated Jan. 14, 2015.

* cited by examiner

DRY MIXTURE IN PARTICULATE FORM FOR PREPARATION OF LIQUID FOODS WITH DISPERSED GAS BUBBLES

CROSS-REFERENCE TO RELATED APPLICATIONS

This application is a continuation of U.S. patent application Ser. No. 15/023,140, filed on Mar. 18, 2016, which is a U.S. national phase application under 35 U.S.C. § 371 of International Application No. PCT/EP2014/071377, filed on Oct. 7, 2014, which claims Paris Convention priority to EP13187672.4 filed Oct. 8, 2013, the entire disclosures of which are incorporated herein by reference for any and all purposes.

FIELD

The present invention relates to a dry mixture in particulate form for preparation of liquid food products with dispersed gas bubbles. The invention further relates to a method for preparation of the liquid food product using the composition of the invention. The invention further relates to liquid food products obtainable by the method of the invention. Finally the invention relates to using a hydrocolloid for keeping gas bubbles dispersed in a liquid.

BACKGROUND OF THE INVENTION

Many beverages and other liquid food products can be prepared by the addition of water to a powder mixture to dissolve or disperse the powder mixture and prepare the liquid food products. Examples of this are instant soup powders: a consumer takes some powder for making instant soup, mixes this with hot water, and the soup is ready for consumption. This is a very simple way to prepare a simple, hot food product. Other examples are well known, such as instant tea powder mix, instant coffee powder mix, cocoa powder mix, and soy-based beverage powder mix. Generation of gas bubbles upon addition of water to a dry mixture is also well known. Examples of this are for example instant cappuccino powders.

Various publications describe dry powders that release gas when they are mixed with water to create beverages. These powders can be used to create a foam layer, for example to produce a cappuccino-like foamy, frothy layer on top of coffee. For example WO 2006/023564 A1 relates to a soluble foaming composition, and in particular, a foaming protein-free composition. WO 2010/005297 A1 relates to a foaming composition for use in beverages such as coffee drinks of the cappuccino type. US 2005/0214429 A1 discloses aerated confections and methods for producing these. WO 2007/039064 discloses compositions that include hydrophobins and which exhibit reduced creaming. WO 2012/030651 A1 relates to the field of microbial polymers, in particular to xanthan gum.

WO 2013/034520 A1 relates to edible powder compositions which, upon mixing with a liquid, form a foam beverage.

SUMMARY OF THE INVENTION

Consumers are interested in new food compositions and food structures, in order to gain new experiences when eating. Nevertheless these new food products should not have negative properties, like a high caloric content, or leading to a high glucose response and therewith possibly contributing to diabetes. Additionally, products should not have a slimy mouthfeel, which may be caused by high concentrations of thickeners.

Therefore one of the objectives of the present invention is to provide a dry ingredient mixture that can be used to prepare instant beverages or other liquid food compositions such as instant soups and/or bouillons, that contain gas bubbles in the continuous liquid phase. The prior art gives numerous examples of dry powders that create a foam layer on top of the beverage (typically for cappuccino-type instant coffee powders), however there are no examples of instant powders for beverages or other liquid compositions that create a gas phase in the continuous liquid phase of the beverage after reconstitution of the powder, and that do not need relatively large amounts of hydrocolloids like starches.

Hence the present invention aims to provide instant beverages or other liquid food compositions that contain gas bubbles in the liquid and wherein the gas bubbles remain in the continuous liquid phase within a time period that which is long enough for the consumer to consume the beverage or liquid food composition. Moreover the invention aims to provide compositions which do not require a high concentration of hydrocolloids, in particular modified starches, to retain gas bubbles in the continuous liquid phase.

This objective has been met by combining a dry mixture in particulate form containing a flavour compound, a water-soluble gas release agent, and a hydrocolloid which provides a yield stress rapidly enough to retain gas bubbles in the continuous liquid phase after the addition of water to the dry mixture in particulate form. The hydrocolloid provides an apparent yield stress of at least 0.3 Pa within a period of 30 seconds after the addition of water to reconstitute the hydrocolloid. Preferably the hydrocolloid has a hydration rate in water at a temperature of 23° C. at a concentration of 1 wt % and a volume weighted mean diameter D4,3 of the hydrocolloid ranging from 40 to 200 micrometer, of less than 3 minutes.

This dry mixture in particulate form can be used to prepare beverages and other liquid food compositions by the consumer by pouring water onto the powder. The gas bubbles remain dispersed in the continuous liquid phase until consumption, giving an aerated liquid composition, with gas bubbles evenly dispersed in the liquid. In contrast, in beverages like cappuccino or beer essentially all bubbles formed in the continuous liquid phase rise to the top relatively quickly to form (foam) froth on top of the product. This aerated product gives the consumer a new food product experience. Moreover the aerated instant soup has reduced calories per volume amount compared to a non-aerated instant soup.

In a first aspect the present invention provides a composition in the form of a dry mixture in particulate form for preparation of a liquid food composition containing dispersed gas bubbles in a continuous liquid phase, the dry mixture in particulate form comprising:
  an instant flavour component in particulate form;
  a water-soluble gas release agent in particulate form that releases gas bubbles upon reconstitution in water; and
  a hydrocolloid in particulate form that provides an apparent yield stress of at least 0.3 Pa within a period of 30 seconds after the addition of water to reconstitute the hydrocolloid; and wherein the instant flavour component is suitable to prepare ice cream and/or desserts and/or milk shakes, which are intended for serving at a temperature below 0° C.

In a second aspect the present invention provides a method for preparation of ice cream and/or desserts and/or milk shakes, comprising bringing a composition according to the first aspect of the invention into contact with water.

In a third aspect the present invention provides an ice cream and/or dessert and/or milk shake composition in the form of a beverage or liquid food product containing gas bubbles in the continuous liquid phase, obtainable by the method according the second aspect of the invention.

In a further aspect the present invention provides a method for keeping gas bubbles in a continuous liquid phase by using a hydrocolloid in particulate form that provides an apparent yield stress of at least 0.3 Pa within a period of 15 seconds after the addition of water to reconstitute the hydrocolloid.

DETAILED DESCRIPTION

All percentages, unless otherwise stated, refer to the percentage by weight. Gas volumes are given at standard conditions, meaning at a temperature of 20° C. and a pressure of 1 atmosphere (1.01325 bar), unless indicated otherwise. Ambient or room temperature is 23±2° C.

Average particle sizes may be expressed as the volume weighted mean diameter D4,3. The volume based particle size equals the diameter of a sphere that has the same volume as a given particle. Alternatively the average particle size may be expressed as the D3,2, which is the Sauter mean diameter. D3,2 is defined as the diameter of a sphere that has the same volume/surface area ratio as a particle of interest.

Ice cream and/or desserts and/or milk shakes: Food products which are intended for serving at a temperature below 0° C.

Dry mixture: relates to a free-flowing powder. This powder may contain moisture, however this moisture generally is not visible to the naked eye.

The term 'oil' as used herein refers to lipids selected from triglycerides, diglycerides, monoglycerides and combinations thereof. The oil may be solid or liquid at ambient temperature. Preferably the oil in the context of this invention comprises at least 90 wt % of triglycerides, more preferably at least 95 wt %. In here the term 'fat' is considered to be synonymous to 'oil'. Preferably the oil is an edible oil. Oils may originate from vegetable origin, such as sunflower oil, palm oil, olive oil, and rapeseed oil. Alternatively the oil may originate from animal origin, such as dairy fat, butter oil, and fish oil. The oil may be modified by fractionation, may be chemically or enzymatically interesterified, or may be fully or partially hardened.

'Aerated' means that a composition contains dispersed gas bubbles. The gas phase may be any gas that is used in the context of food products, such as air, oxygen, nitrogen, carbon dioxide, nitrous oxide, or mixtures of these. Preferably the gas comprises air, nitrogen, or carbon dioxide. Hence the term 'aeration' is not limited to aeration using air, and encompasses the 'gasification' with other gases as well. The extent of aeration is usually measured in terms of 'overrun', which is defined as:

$$\text{overrun} = \frac{\text{volume of aerated product} - \text{volume of initial mix}}{\text{Volume of initial mix}} \times 100\%$$

where the volumes refer to the volumes of aerated product and unaerated initial mix (from which the product is made). Overrun is measured at atmospheric pressure.

In a first aspect the present invention provides a composition in the form of a dry mixture in particulate form for preparation of a liquid food composition containing dispersed gas bubbles in a continuous liquid phase, the dry mixture in particulate form comprising:
　an instant flavour component in particulate form;
　a water-soluble gas release agent in particulate form that releases gas bubbles upon reconstitution in water; and
　a hydrocolloid in particulate form that provides an apparent yield stress of at least 0.3 Pa within a period of 30 seconds after the addition of water to reconstitute the hydrocolloid; and wherein the instant flavour component is suitable to prepare ice cream and/or desserts and/or milk shakes, which are intended for serving at a temperature below 0° C.

Consumers are interested in consuming foods with reduced caloric content, and with a low glycaemic index. The first is important in order to prevent the consumer in gaining weight rapidly. The latter is important in order to prevent increase of the blood glucose level too quickly upon consumption, and this provides sustained energy and reduces the risk of diabetes. Therefore using starches as thickeners has disadvantages, as starch is a polysaccharide with a high glycaemic index and it adds to the caloric value of the product. Further, the thickening properties of starch are not always desirable. Further a side-effect of starch may be a slimy mouthfeel, that is not appreciated by all consumers. Therefore it would be desirable to have an alternative for the use of starch as a means to maintain the bubbles dispersed in the continuous liquid phase of the product.

A powder composition according to the invention has been found particularly suitable to be dissolved or dispersed (i.e. reconstituted) in an aqueous liquid to provide a liquid food product or beverage, wherein bubbles remain dispersed in the continuous liquid phase of the product for a sufficiently long time to prepare, serve and consume the product.

In a preferred embodiment, the food product has an organoleptic property that is appreciated by consumers, not only because of the sensation given by the presence of bubbles but also in that the product may impart a creamy mouthfeel, in particular a mouth-feel resembling fat globules, when consumed.

Further, the invention is in particular advantageous in that it allows the preparation of a fluid food product wherein bubbles remain dispersed in the continuous liquid phase, and which food product preferably has a creamy, at a relatively low viscosity of the product. To this effect, preferably use is made of a hydrocolloid of which a solution or dispersion in water shows thixotropic behaviour.

Further, the invention provides a powder composition for preparing a liquid food product (fluid or spoonable) wherein bubbles remain dispersed in the continuous liquid phase, wherein the concentration of the hydrocolloid, contributing to maintaining the bubbles in the continuous liquid phase for a prolonged time, is relatively low to obtain a dispersion-stabilising effect, compared to for example a thickening agent, such as starch, disclosed in WO 2013/034520 A1.

Hydrocolloid

The hydrocolloid present in the dry mixture in particulate form is reconstituted upon addition of water thereby thickening the fluid and entrapping gas bubbles which are released in the liquid by the addition of water to the gas release agent. A liquid is able to suspend gas bubbles if it contains a polymer (hydrocolloid, polysaccharide, thickener, etc.) that can form a weak network, thus providing a sufficient yield stress. The yield stress opposes the buoyancy force, which is responsible for bubbles' creaming in gas dispersions or foams. An increase in the viscosity of the aqueous phase containing the gas bubbles would not be sufficient to stop their creaming but would just slow it down proportionally to the viscosity increase.

The yield stress can be detected qualitatively. If in a certain system gas bubbles stay suspended and do not cream for a certain period of time, e.g. minutes to hours, then the yield stress of the system is high enough to keep the bubbles suspended. The yield stress that is generated by the dissolved hydrocolloid determines whether gas bubbles rise to the surface or are entrapped in the liquid.

The condition for static bubbles in a liquid which possesses an (apparent) yield stress is (N. Dubash et al. 2004, Physics of Fluids 16(12), p. 4319-4330):

$$\tau \geq \frac{(\rho_l - \rho_g)gD_b}{2\sqrt{2}} \quad (1)$$

Where $\tau$ (in Pa) is the apparent yield stress, $\rho_l$ is the density of the liquid, $\rho_g$ is the density of the gas, g=9.816 m·s$^{-2}$, and $D_b$ is the bubble diameter. The yield stress is the force required to keep a bubble with volume $\frac{1}{6}\cdot\pi\cdot D_b^3$ stationary in the liquid, counteracting the buoyancy. The buoyancy is determined by the density difference between the liquid and the gas, the gravity constant and the surface area of the largest cross-section of the bubble $\frac{1}{4}\cdot\pi\cdot D_b^2$.

Preferably the hydrocolloid provides an apparent yield stress of at least 0.3 Pa within a period of 15 seconds, preferably within a period of 10 seconds after the addition of water to reconstitute the hydrocolloid. Preferably the hydrocolloid is mixed with water. Importantly the hydrocolloid develops the yield stress rapidly enough to entrap the gas bubbles that are released by the dissolution of the gas release agent in added water. Preferably the hydrocolloid provides an apparent yield stress of at least 0.5 Pa, preferably at least 0.7 Pa, preferably at least 1 Pa, within a period of 30 seconds after the addition of water to reconstitute the hydrocolloid. More preferred the hydrocolloid provides an apparent yield stress of at least 0.5 Pa, preferably of at least 0.7 Pa, preferably at least 1 Pa, preferably at least 1.5 Pa, within a period of 15 seconds, preferably 10 seconds, after the addition of water to reconstitute the hydrocolloid. Preferably the yield stress that is obtained within a period of 30 seconds is maximally 5 Pa, preferably 4.5 Pa, preferably 4 Pa. Preferably the yield stress that is obtained within a period of 15 seconds is maximally 5 Pa, preferably 4.5 Pa, preferably 4 Pa. The value of the yield stress of the product is the yield stress at 23° C. The yield stress may be determined based upon the information disclosed herein, in particular in Example 3. In particular if the product is intended for consumption at a different temperature, the yield stress preferably also has a minimum or maximum value as mentioned herein at that temperature. Therefore these yield stresses preferably are determined at the temperature of the liquid that is added to the dry particulate mixture.

In particular, good results have been achieved with a hydrocolloid, which forms a thixotropic fluid after reconstitution in water, at least in the presence of the other ingredients for the food product, at consumption temperature. In general, a hydrocolloid is preferred that is suitable to provide a thixotropic composition, when reconstituted in water at a temperature of 25° C. Such hydrocolloids are also referred herein as 'thixotropic'. Preferably, a solution or dispersion of 0.5 g/L or less of the hydrocolloid in water of 25° C. is thixotropic, in particular a solution or dispersion of the hydrocolloid of about 0.2 g/l or less, e.g. about 0.1 g/L.

Preferably the invention provides a composition in the form of a dry mixture in particulate form for preparation of a liquid food composition containing dispersed gas bubbles in a continuous liquid phase, the dry mixture in particulate form comprising:

an instant flavour component in particulate form;

a water-soluble gas release agent in particulate form that releases gas bubbles upon reconstitution in water; and a hydrocolloid in particulate form, wherein the hydrocolloid has a hydration rate in water at a temperature of 23° C. at a concentration of 1 wt % and a volume weighted mean diameter D4,3 of the hydrocolloid ranging from 40 to 200 micrometer, of less than 3 minutes; and wherein the instant flavour component is suitable to prepare ice cream and/or desserts and/or milk shakes, which are intended for serving at a temperature below 0° C.

Definitions of these parameters are provided later in this specification, and are also described in WO 2012/030651 A1. The contents of WO 2012/030651 A1 are incorporated by reference.

Preferably the hydrocolloid in particulate form comprises a xanthan gum, wherein the xanthan gum has a hydration rate in water at a temperature of 23° C. at a concentration of 1 wt % and a volume weighted mean diameter D4,3 of the hydrocolloid ranging from 40 to 200 micrometer, of less than 3 minutes.

Preferably the hydrocolloid has a hydration rate of less than 2 minutes. Preferably the xanthan gum has a hydration rate of less than 2 minutes.

Preferably the dry hydrocolloid comprises particles having a diameter ranging from about micrometer to 150 micrometer. More preferred the dry hydrocolloid comprises particles having a diameter ranging from about 10 micrometer to 130 micrometer. Preferably the dry hydrocolloid comprises particles having a volume weighted mean diameter D4,3 ranging from 40 to 200 micrometer, preferably from 50 to 150 micrometer, more preferably from 60 to 90 micrometer. Preferably the dry hydrocolloid comprises particles having a Sauter mean diameter D3,2 ranging from 10 to 100 micrometer, preferably from 20 to 70 micrometer, more preferably from 20 to 50 micrometer.

Preferably, the hydrocolloid comprises one or more thixotropic hydrocolloids. Preferably, the hydrocolloid comprises a thixotropic xanthan gum. The advantage of using a thixotropic compound, is that it does not give a slimy mouthfeel.

The preferred hydrocolloid comprises a xanthan gum that yields solutions which have viscosity values equal to and in most cases more than previously known xanthan gums and has the ability to either hydrate faster or fully hydrate as compared to previously known xanthan gums.

Preferably the hydrocolloid comprises a xanthan gum having one or more of the following properties in solution:

(a) a Low Shear Rate Dynamic Viscosity at 3 rpm of more than about 1600 mPa·s, preferably more than 1600 mPa·s, when hydrated in standard tap water at a 0.25 wt % concentration of xanthan gum;

(b) a Sea Water Dynamic Viscosity of more than about 18, preferably more than 18, at 2.85 kg·m$^{-3}$ (1 pound/barrel) when hydrated in synthetic sea water;

(c) a Hydration Rate of less than about 3 minutes, preferably less than 3 minutes, in a 1 wt % NaCl solution at a 1 wt % concentration of xanthan gum; and (d) an ability to essentially fully hydrate in less than about 10 minutes, preferably less than 10 minutes, in a 6 wt % NaCl solution at a 1 wt % concentration of xanthan gum.

Preferably the properties herein are determined at a temperature of 23±2° C.

Preferably the hydrocolloid comprises a xanthan gum, having the following properties in solution at 23±2° C.:
- a hydration rate of less than 3 minutes in a 1 wt % NaCl solution at a 1 wt % concentration of xanthan gum; and
- an ability to fully hydrate in less than 10 minutes in a 6 wt % NaCl solution at a 1 wt % concentration of xanthan gum.

Preferably the hydrocolloid comprises a xanthan gum having one or more of the following properties in solution, preferably determined at a temperature of 23° C.±2° C.:
- a Low Shear Rate Dynamic Viscosity at 3 rpm of more than about 1800 mPa·s when hydrated in standard tap water at a 0.25 wt % concentration of xanthan gum;
- a Low Shear Rate Dynamic Viscosity at 3 rpm of more than about 1750 mPa·s in a 0.01 M NaCl solution at a 0.25 wt % concentration of xanthan gum; and/or
- a Low Shear Rate Dynamic Viscosity at 3 rpm of more than about 1700 mPa·s in a 0.1 M NaCl solution at a 0.25 wt % concentration of xanthan gum.

Preferably the hydrocolloid comprises a xanthan gum having a Sea Water Dynamic Viscosity of more than about 20 at 2.85 kg·m$^{-3}$ (1 pound/barrel) when hydrated in synthetic sea water.

Preferably the hydrocolloid comprises a xanthan gum having a Hydration Rate of less than about 2 minutes in a 1 wt % NaCl solution at a 1 wt % concentration of xanthan gum, or preferably less than about 4 minutes in a 3 wt % NaCl solution at a 1 wt % concentration of xanthan gum, or preferably less than about 6 minutes in a 3 wt % citric acid solution at a 0.4 wt % concentration of xanthan gum.

Preferably the hydrocolloid comprises a xanthan gum having the ability to essentially fully hydrate in less than about 8 minutes in a 6 wt % NaCl solution at a 1 wt % concentration of xanthan gum, or fully hydrate after about 1 hour of proper mixing at 1800 rpm under ambient conditions in a 10 wt % ammonium nitrate solution at a 0.2 wt % concentration of xanthan gum.

Preferably the hydrocolloid comprises a xanthan gum having a dynamic viscosity, as measured using a Brookfield Model LV viscometer, No. 1 Spindle, at 3 rpm, after one hour of mixing at 1800 rpm under ambient conditions of more than about 1750 mPa·s when hydrated in a 0.01 M NaCl solution at a 0.25 wt % concentration of xanthan gum, preferably more than about 1900 mPa·s, preferably more than about 2100 mPa·s. Preferably, under these conditions the preferred xanthan gum has a dynamic viscosity of maximally 2400 mPa·s, preferably 2600 mPa·s.

Preferably the xanthan gum has a dynamic viscosity of more than about 1900 mPa·s when hydrated in a 0.1 M NaCl solution at a 0.25 wt % concentration of xanthan gum, preferably more than about 2100 mPa·s.

Xanthan gums of the prior art exhibited significantly lower viscosities and may not have fully hydrated after one hour of mixing.

Preferably the hydrocolloid comprises a xanthan gum that has been obtained from the fermentation of an Asian Xanthomonas campestris strain, i.e., Xanthomonas campestris pathover campestris, deposited with the American Type Culture Collection (ATCC) under the accession no. PTA-11272. The fermentation requires a nitrogen source, a carbon source and other appropriate nutrients known to the skilled person, as described in WO 2012/030651 A1.

These preferred properties may be combined into the properties of the preferred hydrocolloid comprising xanthan gum in any order. Therefore the preferred hydrocolloid comprising xanthan gum may exhibit any one, any two, any three, any four, any five, any six, or all of the listed properties.

The terms 'fully hydrate', 'essentially fully hydrate', 'full hydration', '100% hydration', and the like as used herein mean that the solution has a homogeneous appearance, such that there is an absence of particles that are visible to the unaided human eye and the viscosity of the solution in the particular medium is not substantially changed from the viscosity obtained in standard tap water. The description 'not substantially changed' is used herein to mean that the viscosity of the solution in the particular medium differs by less than about 25%, alternatively less than about 20%, alternatively less than about 15%, alternatively less than about 10%, alternatively less than about 7%, or alternatively less than about 5%, from the viscosity obtained in standard tap water.

Standard tap water (STW) is prepared by dissolving 1.0 g of NaCl and 0.15 g CaCl$_2$-2H$_2$O in 1 liter of deionised water.

Preferably, when the preferred hydrocolloid comprising a xanthan gum that is hydrated in standard tap water to a 0.25 wt % concentration of xanthan gum, the resulting solution preferably has a Low Shear Rate Dynamic Viscosity at 3 rpm of more than about 1800 mPa·s. Preferably when hydrated in standard tap water to a 0.25 wt % concentration of xanthan gum, the solution has a Low Shear Rate Dynamic Viscosity at 3 rpm of more than about 2000 mPa·s. Preferably when the preferred xanthan gum is hydrated in standard tap water to a 0.25 wt % concentration, the solution preferably has a Low Shear Rate Dynamic Viscosity at 3 rpm of more than about 1600 mPa·s, preferably more than about 1800 mPa·s, preferably more than about 2000 mPa·s, preferably more than about 2200 mPa·s, preferably more than about 2500 mPa·s. Unless otherwise specified, under these conditions, when hydrated in standard tap water to a 0.25 wt % concentration of xanthan gum, the solution can have a Low Shear Rate Dynamic Viscosity at 3 rpm of up to about 2700 mPa·s, or up to about 2900 mPa·s.

Preferably the hydrocolloid comprising a xanthan gum has a Sea Water Dynamic Viscosity of more than about 20 at 2.85 kg·m$^{-3}$ (1 pound/barrel), preferably more than about 22 kg·m$^{-3}$, preferably more than about 24.0 at 2.85 kg·m$^{-3}$ (1 pound/barrel), preferably up to about 28.0 at 2.85 kg·m$^{-3}$ (1 pound/barrel).

With respect to Hydration Rate, the preferred hydrocolloid comprises a xanthan gum that preferably has solution properties as follows. Preferably the xanthan gum has a Hydration Rate of less than about 3 minutes, less than about 2.5 minutes, less than about 2 minutes, or less than about 1.5 minutes in a 1 wt % NaCl solution at a 1 wt % concentration of xanthan gum. Preferably, even when the NaCl level of the solution is increased to 3 wt %, the xanthan gum at a 1 wt % concentration when in solution exhibits a Hydration Rate of less than about 4 minutes, preferably less than about 3 minutes, preferably less than about 2 minutes. In other media, such as a 3 wt % citric acid solution at a 0.4 wt % concentration of xanthan gum, preferably the Hydration Rate is also relatively fast at less than about 6 minutes. For a solution of 40 wt % sucrose +4 wt % NaCl at a 0.35 wt % concentration of xanthan gum, preferably the Hydration Rate is less than about 8 minutes.

The preferred hydrocolloid comprises a xanthan gum that preferably is more tolerant of difficult hydration media. Preferably the xanthan gum has the ability to essentially fully hydrate in less than about 10 minutes, less than about 9 minutes, less than about 8 minutes, less than about 7 minutes, or less than about 6 minutes in a 6 wt % NaCl solution at a 1 wt % concentration of xanthan gum. For conventional xanthan gum 6 wt % NaCl is sufficient to inhibit the hydration of the gum.

Further, preferably the xanthan gum is able to obtain full hydration in about 1 hour of propeller mixing at 1800 rpm under ambient conditions in a 10 wt % ammonium nitrate solution at a 0.2 wt % concentration of xanthan gum (3 rpm dynamic viscosity of 5000 mPa·s, Brookfield No. 1 spindle). Under these conditions, preferably the xanthan gum is able to obtain full hydration in about 0.7 hour, in about 0.8 hour, in about 0.9 hour, in about 1.0 hour, in about 1.1 hour, in about 1.2 hour, or in about 1.3 hour of propeller mixing at 1800 rpm under ambient conditions in a 10 wt % ammonium nitrate solution at a 0.2 wt % concentration of xanthan gum.

The test methods described herein to characterise the preferred hydrocolloid comprising a xanthan gum are the following.

Low Shear Rate Dynamic Viscosity. Xanthan gum (0.75 g, accuracy 0.01 g) is slowly added to 299 mL of standard tap water contained in a 400 mL tall form beaker while stirring at 800±20 rpm. Stirring is continued for approximately 4 hours. Just before removing the test solution from stirring (after 4 hours), the solution temperature is adjusted to 25±2° C. The test solution is removed from the stirrer and allowed to sit undisturbed at room temperature for 30±5 minutes (may be placed in a temperature-controlled water bath). After 30 minutes the temperature is measured by inserting a thermometer into the solution between the center and the side of the beaker. For accuracy, the solution is not disturbed prior to measuring the dynamic viscosity. The dynamic viscosity at 25±2° C. is measured using a Brookfield Model LV Viscometer, No. 1 spindle at 3 rpm. The dynamic viscosity in mPa·s is recorded after allowing the spindle to rotate for 3 minutes.

Seawater Dynamic Viscosity. Sea water solution is prepared according to ASTM D1141-52 by dissolving 41.95 g of sea salt (ex Lake Products Co., Inc., Maryland Heights, Mo., USA) in 1 liter de-ionised water. A 300 mL portion of sea water solution is transferred to a mixing cup that is attached to a Hamilton-Beach 936-2 mixer (Hamilton-Beach Div., Washington, D.C.). The mixer speed control is set to low and a single fluted disk is attached to the mixing shaft. At the low speed setting, the mixer shaft rotates at approximately 4,000-6,000 rpm. A 0.86 g portion of xanthan gum is slowly added over 15-30 seconds to the mixing cup and allowed to mix for 5 minutes. The mixer speed control is set to high (11,000±1,000 rpm) and the test solution is allowed to mix for approximately 5 minutes. The mixture is allowed to mix for a total of 45 minutes, starting from time of xanthan gum addition. At the end of the 45 minutes mixing time, 2-3 drops of Bara-Defoam® defoaming agent (ex NL Baroid/NL Industries, Inc., Houston, Tex., USA) is added and stirring is continued for an additional 30 seconds. The mixing cup is removed from the mixer and immersed in chilled water to lower the fluid's temperature to 25° C.±0.5° C. In order to ensure a homogeneous solution, the solution is re-mixed after cooling for 5 seconds at 11,000±1,000 rpm. The solution is transferred from the mixing cup to 400 ml Pyrex beaker and Fann viscosity (Fann Viscometer, Model 35A) is measured. This is accomplished by mixing at 3 rpm. The reading is allowed to stabilise and then the shear stress value is read from dial and recorded as the Sea Water Dynamic Viscosity value at 3 rpm.

Hydration Rate. A Hydration Rate tester is used to measure the Hydration Rate of xanthan gum in an aqueous solution. Hydration Rate is defined as the amount of time for the sample to reach 90% of maximum torque using a torque load cell. While this does not directly measure full hydration, the 90% point is a useful metric for sample comparison. The 100% point obtained is more variable since the approach to the final value is gradual and is affected by even small amounts of random error in the measurement. The instrument utilises a variable speed motor to stir the solvent in a beaker that is mounted to a torque sensing load cell. The xanthan gum is added to the solvent while mixing at a constant speed to begin the test. As solution viscosity builds due to the hydration of the xanthan gum, the torque (twisting force) on the beaker increases. The torque values are continuously monitored by a computer which normalises, prints and plots the data in terms of percentage torque versus time. While torque is not a direct measure of the viscosity of the sample, torque provides a valuable measure of the viscosity development over time.

Hydration Rate Procedure: The test uses 80 mesh particle size xanthan gum, which is dispersed in polyethylene glycol (PEG) at a weight ratio of 3:1 and hand mixed at room temperature (23±2° C.). Samples to be tested are mixed with the dispersant immediately before the test is started. Standard tap water is prepared by dissolving 1.0 g of NaCl and 0.15 g $CaCl_2 \cdot 2H_2O$ in 1 liter of de-ionised water. A volume of 130 mL is used in a 250 mL stainless steel beaker. Xanthan gum is tested at 1 wt %. The stirrer is a H-bar stirrer with the following dimensions: overall length 20.3 cm, length to cross member 17.8 cm, 3.8 cm×3.8 cm in 'H' (0.64 cm stainless dowel used). The H-bar stirrer has a 2-4 mm clearance from the bottom of the cup in order to mix the solution while maintaining a vortex in the solution. The direction of the 'H' is upright, and a shaft is connected to the 'horizontal bar' of the 'H'. The stirrer speed is set at 600 rpm. The sample is added over a 4-5 second period of time in a very controlled and constant fashion. For consistency and accuracy, the sample must not be added too fast or slow or in an uneven manner. The data are scaled from 0 to 100% of the maximum torque that occurs during the test. The time to reach 90% of maximum torque is taken as the Hydration Rate. This value is found to be stable and repeatable.

The hydrocolloid preferably comprises the xanthan gum as described and defined in WO 2012/030651 A1. A preferred xanthan gum is Keltrol AP or Keltrol AP-F, supplied by CP Kelco (Nijmegen, Netherlands). Most preferred is the xanthan gum Keltrol AP-F, supplied by CP Kelco (Nijmegen, Netherlands).

Advantages of using the preferred xanthan gum, are that the xanthan gum not only rapidly provides the required yield stress, and that additionally the xanthan gum provides this effect independent of the water temperature. Therefore the water temperature for mixing with the dry mixture in particulate form of the invention may have a broad range. Opposite to this, especially native starches mostly need water at high temperature to gelatinise, at least at a temperature above the gelatinisation temperature.

Moreover the required amount of the preferred xanthan gum is lower than for example the starches of the prior art. This has the advantage that the amount of calories as supplied by the liquid food product containing xanthan gum is lower than for a liquid food product containing starch. Xanthan gum is a complex polysaccharide which is digested by the bacterial population in the colon (see J. Daly et al., 1993, British Journal of Nutrition, 69, p. 897-902), and hence does not contribute to the caloric value of the liquid food product. Consequently also the blood glucose level is not increased upon consumption of xanthan gum, like for starches. Therefore the glucose level is kept at a more constant level, which is advantageous for the health of the consumer, and especially advantageous in that it reduces the risk of obtaining diabetes.

Preferably at least 25 wt % of the total hydrocolloid content in the dry mixture in particulate form is formed by the hydrocolloid according to the invention, preferably one or more thixotropic hydrocolloids, preferably the preferred xanthan gum. Preferably at least 50 wt % of the total hydrocolloid content in the dry powder composition is formed by the hydrocolloid according to the invention, preferably one or more thixotropic hydrocolloids, preferably the preferred xanthan gum. Preferably at least 90 wt % of the total hydrocolloid content in the dry powder composition is formed by the hydrocolloid according to the invention, preferably one or more thixotropic hydrocolloids, preferably the preferred xanthan gum. More preferred at least 95 wt % of the total hydrocolloid content in the dry powder composition is formed by the hydrocolloid according to the invention, preferably one or more thixotropic hydrocolloids, preferably the preferred xanthan gum.

The dry mixture in particulate form of the invention preferably is essentially free from added pregelatinised starch, preferably pregelatinised modified starch. If pregelatinised starch or pregelatinised modified starch is present, the total starch concentration preferably is less than 0.5 wt %, based on dry-weight, in particular 0.1 wt % or less. The dry mixture in particulate form of the invention preferably is essentially free from added carrageenan. If present, the carrageenan concentration preferably is less than 0.5 wt %, based on dry weight, in particular 0.1 wt % or less. The dry mixture in particulate form of the invention preferably is essentially free from added guar gum. If present, the guar gum concentration preferably is less than 0.5 wt %, based on dry-weight, in particular 0.1 wt % or less.

Nevertheless, the dry mixture in particulate form of the invention may comprise one or more native starches as an additional hydrocolloid. Preferably the one or more native starches originate from potato. In case such additional hydrocolloid is present in the dry mixture in particulate form, then less than 25% of the total hydrocolloid content in the dry mixture in particulate form may be formed by the hydrocolloid according to the invention. Preferably the amount of hydrocolloid according to the invention is smaller than the amount of the additional hydrocolloid. Preferably the total ratio of the amount of hydrocolloid according to the invention, and the one or more additional hydrocolloids ranges from 1:5 to 1:10 wt/wt.

The combination of the hydrocolloid according to the invention, preferably comprising a xanthan gum, combined with one or more native starches, is that these hydrocolloids enforce each other's functionality. The concentration of both types of materials can be decreased as compared to their single use.

Gas Release Agent

The gas release agent may be any gas release agent which conforms to the requirements as defined in the present definition of the invention. A gas release agent typically comprises a solid matrix material (i.e. solid at least at 25° C.) in which internal voids are present, wherein the gas is entrapped. The gas may be pressurised or may be present at atmospheric pressure. Preferably the gas is pressurised. The solid material may comprise any edible solid material, in particular any substance selected from the group of carbohydrates or polysaccharides, proteins, and emulsifiers, and combinations of these.

Particularly suitable as a source for the protein for the solid material of the gas-containing gas release agent are skim milk powder, whey protein concentrate, whey powder, caseinate, and the like.

Preferably the gas release agent comprises particles of which the matrix contains a polysaccharide, preferably maltodextrin. The particle matrix preferably contains protein, or a combination of protein and polysaccharide.

Preferred carbohydrates for the gas release agent include oligosaccharides obtainable by hydrolysing starch (hydrolysed starches), in particular hydrolysed starches having a DE of 10-45, glucose syrup, maltodextrins and lactose. nOSA-starch (n-octenyl succinyl anhydride modified starch of hydrophic starch) is another preferred carbohydrate.

Preferably, the solid material for the gas release agent at least substantially consists of a carbohydrate, in particular a maltodextrin and/or nOSA starch. In a specific embodiment, the carbohydrate content of the gas release agent is 90-100% based on dry weight.

The gas that is released by the gas release agent upon dissolution may be any gas that is used in the context of food products, such as air, oxygen, nitrogen, carbon dioxide, nitrous oxide, or mixtures of these. Preferably the gas comprises air, nitrogen, or carbon dioxide. Preferably the gas release agent releases at least 1 milliliter of gas per gram of dry gas release agent, at standard conditions. Preferably the amount of gas is such that the amount of gas released ranges from 1 to 100 mL, preferably from 1 to 50 mL, preferably from 5 to 30 mL of gas per gram of dry gas release agent, under standard conditions.

The gas-containing gas release agent particles are typically porous. Usually, such porous particles are prepared by a spray drying technique applying gas injection in a liquid feed to be atomised typically via the use of a high pressure atomisation nozzle.

The gas-containing gas release agents may contain particles holding non-pressurised gas (wherein the gas pressure in the internal voids is about 1 bar), such as non-pressurised spray dried foamers. Such foamers are generally known in the art, and described in detail in, for instance, U.S. Pat. No. 4,438,147 or EP 458 310 A.

Good results have been achieved with a gas release agent comprising particles containing a pressurised gas, i.e. having a pressure of more than 1.0 bar, in particular of 1.5 bar or more. Such gas release agents are e.g. known from WO 2006/023564, EP 2 025 238 A1 and references cited therein.

Preferably, the solid matrix material for the gas release agent comprises a protein, optionally in combination with a carbohydrate, in particular a maltodextrin. The presence of a protein is advantageous at least in some applications in that it may contribute to bubble-dispersion properties of the product.

Preferably, the gas release agent comprises pressurised gas, in particular air or nitrogen, and the matrix material is formed by a protein and a maltodextrin, plus optionally nOSA starch.

The gas-containing gas release agent may further contain one or more plasticizers to improve the robustness of the solid matrix material. The presence of one or more plasticizers is in particular preferred for gas release agent containing pressurised gas. If present, the plasticizers are preferably selected from the group consisting of polyols or sugar alcohols, such as glycerol, mannitol, sorbitol, lactitol, erythritol, trehalose and/or lipids other than fat, such as fatty acids, monoglycerides, phospholipids.

Additionally the gas release agent may further include additional stabilizing agents to increase the dispersion stability of the bubbles in the bulk of the food product, to stabilise pH or to prevent protein from flocculation (after reconstitution). Preferred stabilisers are sodium or potassium citrates and orthophophates. Further, a free flowing aid may be present, preferably silicon dioxide or tricalcium phosphate.

The gas release agent usually has a loose bulk density of at least 150 g/L. Usually the loose bulk density is 350 g/L or less, in particular in the range of 180-300 g/L, more in particular 200-240 g/L. A density within this range can be obtained by the person skilled in the art using known technology. For instance use can be made of gas injection into the aqueous feed slurry just before atomisation, which is done preferably with nitrogen gas. This allows preparation of products of such lower densities. Such particles typically have porous structures, in particular containing voids in the range of 1-30 micrometer.

Preferably, at least 90 wt % of the gas release agent particles is formed by particles having a size less than 200 micrometer, more preferably essentially all particles have a size of less than 200 micrometer, as determined by a screen test method, using a 200 micrometer (60 mesh) screen. Preferably, at most 85 wt % of the particles is formed by particles having a size of 75 micrometer or more, as determined by a screen test method, using a 75 micrometer (200 mesh) screen. The weight fraction of the gas release agent in the powder composition is usually at least 5 wt %, based on dry weight, preferably at least 10 wt %. The weight fraction of the gas release agent is usually 50 wt % or less, preferably 30 wt % or less.

Preferably the gas release agent contains an emulsifier, in order to readily disperse the gas bubbles. Preferably the emulsifier has a HLB-value of at least 7, preferably at least 10. Alternatively or additionally, preferably the instant flavour component contains an emulsifier, in order to readily disperse the gas bubbles. Preferably such emulsifier has a HLB-value of at least 7, preferably at least 10. Further, a free flowing aid may be present, preferably silicon dioxide or tricalcium phosphate.

Alternatively, the gas release agent does not contain pressurised gas that is released due to the dissolution of the surrounding matrix. Alternatively the gas is released by reaction between two or more compounds when they dissolve in water, creating gas bubbles. The gas release agent may comprises a carbonate salt and/or a bicarbonate salt and an acidulant and/or an amphiphilic substance. This way carbon dioxide is released upon the addition of water by chemical reaction between the carbonate salt and/or bicarbonate salt and the acidulant and/or amphiphilic substance.

Preferably the combination of carbonate salt and/or bicarbonate salt and acidulant and/or amphiphilic substance comprises agglomerates of carbonate salt and/or bicarbonate salt particles and particles of the acidulant and/or amphiphilic substance.

The (bi)carbonate can be of any food grade carbonate or bicarbonate salt, preferably bicarbonate salt. An advantage of bicarbonate resides in its decomposition properties. At least in some applications, in particular in formulations for acidic food products, a considerable contribution to gas release is achievable by contact with (hot) water without requiring additional acidulant (in addition to acid that may be present in the flavour/aroma component, such as coffee drink component). Usually the carbonate or bicarbonate salt is a sodium or potassium salt. Potassium is preferred from a health and taste perspective.

Preferably bicarbonate salt or carbonate salt particles are partially or fully coated with the amphiphilic substance.

Preferably the amphiphilic substance is a salt of a fatty acid, preferably a bivalent salt of a fatty acid, more preferably a calcium or magnesium salt of a fatty acid. Preferably the amphiphilic substance is the salt of an unbranched or branched fatty acid have 6-24 carbon atoms, in particular of a saturated unbranched or branched fatty acid have 6-24 carbon atoms, more preferably a stearate salt.

However, in order to have a relatively high gas release rate with a chemical gas release agent based on a (bi) carbonate, it is advantageous to include an added acidulant. In principle, any food-grade acidulant may be used. This acidulant can be organic or inorganic. An example of a suitable organic acid is citric acid. In particular, preferred is an acidulant that reacts from a non-acidic component to a acidic component in the presence of water, such as being glucono-delta-lactone (GDL). Herewith the release rate of the gas can be controlled and matched with the rate at which the hydrocolloid dissolves or disperses in the water of other aqueous liquid (and thus the rate at which the yield stress is increased).

A chemical gas release agent, such as a (bi)carbonate, is in particular suitable for preparing a liquid with a neutral or acidic pH after reconstitution in water. The pH is preferably lower than neutral pH and higher than the acidic pH at which the protein component, if present, will flocculate or becomes (partly) insoluble. In general, after reconstitution in hot water the pH is between about neutral pH and an acidic pH of up to 2 unit below neutral pH, in particular up to 1 unit below neutral pH. Typically, the apparent pH (the pH measured with a standard pH electrode at about 65° C.) is 7 or less, preferably 5-7.0, in particular 6-7.0, more in particular 6.2-6.7.

Dry Mixture in Particulate Form

The weight ratio between the instant flavour component and the gas release agent ranges from 20:1 to 1:5, preferably from 15:1 to 1:4. More preferred the weight ratio between the instant flavour component and the gas release agent ranges from 10:1 to 1:1. The weight ratio between the instant flavour component and the hydrocolloid ranges from 100:1 to 1:10, preferably from 50:1 to 1:1.

The weight fraction of the hydrocolloid, preferably the xanthan gum, in the powder composition is usually at least 0.5 wt %, based on dry weight, preferably at least 1.0 wt %. The weight fraction of the hydrocolloid, preferably the xanthan gum, is usually 5 wt % or less, in particular 4.0 wt % or less, preferably 3.5 wt % or less, more preferably 3.0 wt % or less. Preferably at least 50 wt % of the total hydrocolloid content in the powder composition is formed by one or more thixotropic hydrocolloids, more preferably 90 to 100 wt % of the total hydrocolloid content, in particular 95 to 100 wt % of the total hydrocolloid content.

The dry mixture in particulate form according to the invention preferably comprises from 1 wt % to 80 wt % of the gas release agent. Preferably the dry mixture in particulate form comprises from 5 wt % to 70 wt %, preferably from 10 wt % to 50 wt %.

The dry mixture in particulate form comprises an instant flavour component, to prepare a liquid food composition. The instant flavour component is suitable to prepare ice cream and/or desserts and/or milk shakes, which are intended for serving at a temperature below 0° C.

Preferably the flavour components contains surface active components. This helps to prevent coalescence of gas bubbles.

The dry mixture in particulate form of the invention preferably comprises from 1 wt % to 99 wt % of the instant flavour composition. More preferred the concentration of the instant flavour composition comprises from 5 wt % to 95 wt % of the dry mixture in particulate form.

The dry mixture in particulate form is prepared by any method known to the skilled person that is suitable to prepare such dry mixture in particulate form.

Method for Preparing Liquid Food Composition

In a second aspect the present invention provides a method for preparation of a liquid food product, comprising bringing a composition according to the first aspect of the invention into contact with water. Preferably the composition according to the invention is mixed with water.

Preferably the weight ratio between dry mixture in particulate form and water ranges from 1:100 to 1:1, preferably from 1:50 to 1:1. Preferably the weight ratio of gas release agent to water ranges from 1:200 to 1:3, preferably from 1:100 to 1:5, preferably from 1:80 to 1:10. Preferably the weight ratio of instant flavour component to water ranges from 1:50 to 1:1, preferably from 1:20 to 1:1. Preferably the weight ratio of hydrocolloid of the invention to water ranges from 1:1000 to 1:100, preferably from 1:500 to 1:125, preferably from 1:250 to 1:150, and most preferred from 1:222 to 1:166. Preferably the concentration of the hydrocolloid in the beverage or liquid food composition according to the invention that is obtained by the method ranges from 0.1 wt % to 1 wt %, preferably from 0.2 wt % to 0.8 wt %, preferably from 0.4 wt % to 0.7 wt %, and most preferred from 0.45 wt % to 0.6 wt %. The advantage of the hydrocolloid of the invention is that a relatively low concentration is required as compared to the hydrocolloids of the prior art.

Preferably the amount of water to the amount of gas release agent, based on the gas volume at standard conditions provided by the gas release agent when all gas is released is at least 1 mL gas per 100 mL liquid product (i.e. 1% overrun). Preferably the ratio ranges from 5 mL gas per 100 mL liquid product (i.e. 5% overrun) to 100 mL gas per 100 mL liquid product (i.e. 100% overrun).

Alternatively, when the hydrocolloid according to the invention is used in combination with one or more native starches, then preferably the concentration of the one or more native starches ranges from 0.5 wt % to 3 wt %, preferably from 1 to 2 wt %, most preferred from 1.3 wt % to 1.8 wt % in the beverage or liquid food composition according to the invention. In case such additional hydrocolloid is present in the dry mixture in particulate form, then preferably the concentration of the hydrocolloid according to the invention in the continuous liquid phase that is obtained by the method according to the invention ranges from 0.1 wt % to 0.3 wt %, preferably from 0.15 wt % to 0.25 wt % in the beverage or liquid food composition according to the invention.

Preferably the temperature of the water ranges from 40° C. to 100° C., preferably from 60° C. to 100° C., preferably from 70° C. to 100° C. Alternatively the water may be of a lower temperature, dependent on the type of beverage to be prepared. For example some beverages are served cold, meaning below room temperature. In that case the water temperature preferably ranges from 0° C. to 25° C., preferably from 3° C. to 23° C. When the hydrocolloid according to the invention is used in combination with one or more native starches, then preferably the temperature of the water is at least 60° C., preferably at least 70° C.

Liquid Food Composition Obtainable by the Method of the Invention

In another aspect the present invention provides a composition in the form of a liquid food product containing gas bubbles in the continuous liquid phase, obtainable by the method according the second aspect of the invention.

The present invention also provides a composition in the form of a liquid food product containing gas bubbles in the continuous liquid phase, obtained by the method according to the second aspect of the invention.

Preferably after reconstitution a composition is obtained which maintains gas bubbles throughout the continuous liquid phase of the product for at least 10 minutes preferably at least 15 minutes, preferably at least 20 minutes, preferably at least 30 minutes.

Preferably after reconstitution, the gas bubbles constitute from 1% to 50% of the volume of the dispersion, preferably from 3% to 40% of the volume of the dispersion. Preferably after reconstitution, the gas bubbles constitute from 1% to 50% of the volume of the composition, preferably from 3% to 40% of the volume of the composition. More preferred the volume of the gas bubbles ranges from 5% to 30% of the volume of the dispersion, and most preferred from 10% to 20% of the volume of the dispersion. More preferred the volume of the gas bubbles ranges from 5% to 30% of the volume of the composition, and most preferred from 10% to 20% of the volume of the composition. The volume of the dispersion includes the volume of the liquid and the volume of the gas bubbles dispersed in the liquid.

Preferably at least 90% of the gas volume, at least directly after reconstitution, is formed by gas bubbles having a diameter of 200 micrometer or less, preferably 150 micrometer or less.

Preferably at least 90% of the gas volume, at least directly after reconstitution, is formed by gas bubbles having a diameter of at least 10 micrometer, preferably at least 20 micrometer. Preferably the gas bubbles have a diameter ranging from 10 to 200 micrometer. Preferably, this is the case for at least 10 minutes, preferably at least 15 minutes, more preferably at least 30 minutes after preparation of the food product.

The liquid food composition is ice cream and/or desserts and/or milk shakes, which are intended for serving at a temperature below 0° C.

Preferably the liquid food product according to the invention is essentially free from added pregelatinised starch, preferably pregelatinised modified starch. If pregelatinised starch is present, the total starch concentration in the liquid food product is preferably less than 0.5 wt %, preferably 0.1 wt % or less. Preferably the beverage or liquid food product according to the invention is essentially free from added carrageenan. If present, the carrageenan concentration in the liquid food product is preferably less than 0.5 wt %, in particular 0.1 wt % or less. Preferably the beverage or liquid food product according to the invention is essentially free from added guar gum. If present, the guar gum concentration in the liquid food product is preferably less than 0.5 wt %, in particular 0.1 wt % or less.

Method for Using the Hydrocolloid

The present invention may provide a method for keeping gas bubbles in a continuous liquid phase by using a hydrocolloid in particulate form that provides an apparent yield stress of at least 0.3 Pa within a period of 15 seconds after the addition of water to reconstitute the hydrocolloid. Preferably the hydrocolloid in particulate form is mixed with water to reconstitute the hydrocolloid. Preferred embodiments disclosed in the context of this invention, are applicable to this aspect of the invention, mutatis mutandis.

This provides use of a hydrocolloid in particulate form that provides an apparent yield stress of at least 0.3 Pa within a period of 15 seconds after the addition of water to reconstitute the hydrocolloid for keeping gas bubbles in the continuous liquid phase. Preferably the hydrocolloid in particulate form is mixed with water to reconstitute the hydrocolloid.

EXAMPLES

Figure 1:
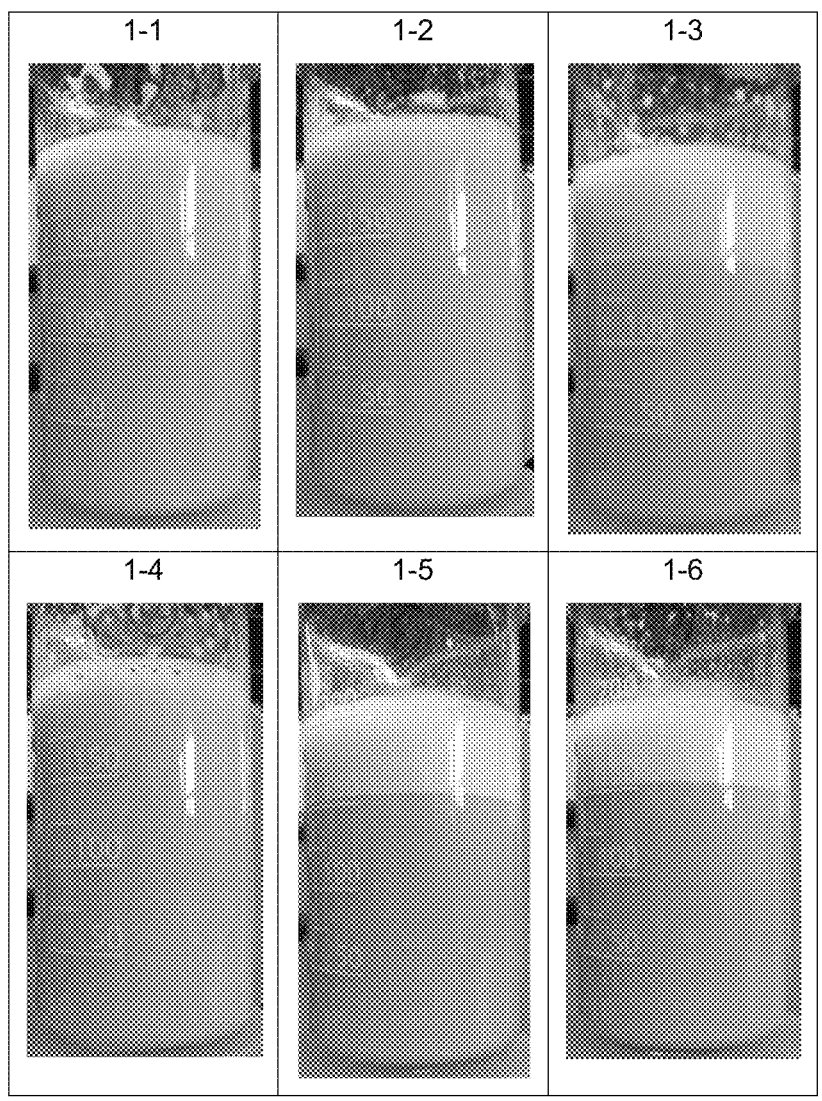
FIG. 1 Pictures of aerated instant mushroom soup samples, from Example 1. All pictures taken about 1 minute after adding water to the dry mix.
Figure 2:
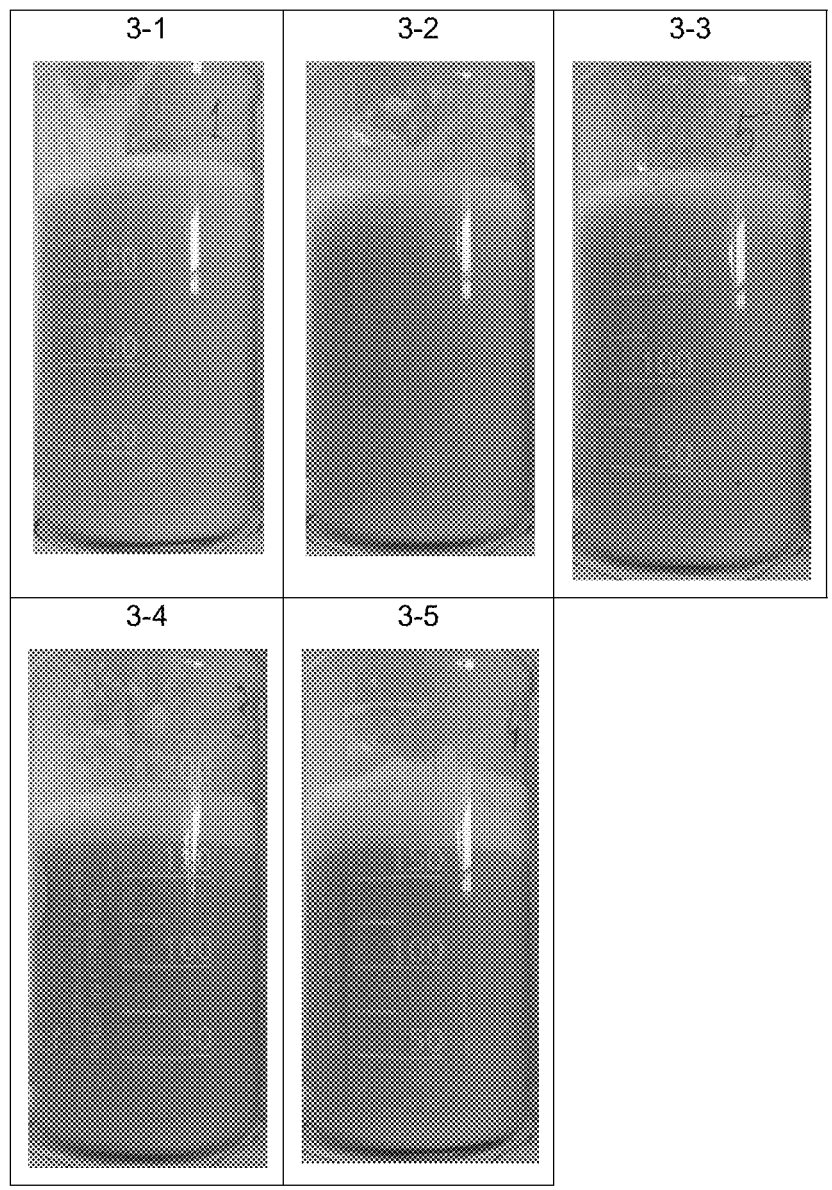
FIG. 2 Pictures of aerated instant mushroom soup samples, from Example 2. All pictures taken 30 seconds after adding water to the dry mix.
Figure 3:
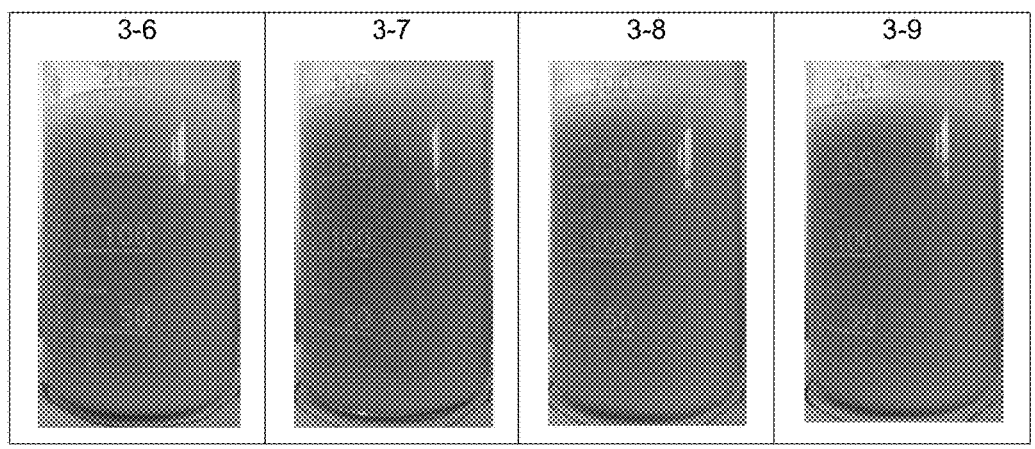
FIG. 3 Pictures of aerated instant mushroom soup samples, from Example 2. All pictures taken 40 seconds after adding water to the dry mix.

The following non-limiting examples illustrate the present invention.

Raw Materials

Composition instant mushroom cream soup powder as used (ex Unilever Germany, Heilbronn, Germany).

TABLE 1

Composition of dry instant mushroom soup mixes

| Ingredient | Mix 1 | Mix 2 |
|---|---|---|
| Native potato starch, 8% moisture | 11.1% | |
| Native potato starch, Granulated | 22.2% | |
| Salt | 5.9% | 8.8% |
| Yeast extract (18% NaCl) | 5.8% | 8.7% |
| Creamer | 32.9% | 57.9% |

TABLE 1-continued

Composition of dry instant mushroom soup mixes

| Ingredient | Mix 1 | Mix 2 |
|---|---|---|
| Flavours, spices, herbs | 5.7% | 8.6% |
| Mushroom powder | 10.7% | 16.0% |

Native potative starch, 8% moisture: ex Südstärke GmbH (Schrobenhausen, Germany).

Native Potato Starch Granulated: contains 87% native potato starch and 13% glucose syrup (maize), ex Avebe (Veendam, The Netherlands).

Creamer: contains palm oil and palm oil stearin (76.8%), lactose (6.6%), Na, Ca caseinate (7.8%), potassium phosphate dibasic (1.0%), glucose syrup (7.8%).

Xanthan gum: Keltrol AP, Keltrol AP-F, and Keltrol RD ex CP Kelco (Nijmegen, The Netherlands).

Keltrol AP and AP-F are described and claimed in WO 2012/030651 A1.

The particle size distribution of Keltrol AP, Keltrol AP-F powders was determined in house, using a Mastersizer 2000 (Malvern Instruments Ltd., Malvern, Worcestershire, UK), equipped with a Sirocco powder accessory. The average sizes were:

| | D3,2 [micrometer] | D4,3 [micrometer] |
|---|---|---|
| Keltrol AP | 53 | 109 |
| Keltrol AP-F | 30 | 78 |

Modified starches: Agglomerated Prejel VA70, and Eliane SC160 from Avebe (Veendam, The Netherlands). Prejel is a pregelatinised hydroxypropyl distarch phosphate of potato origin; and Eliane is a pre-gelatinised waxy potato starch containing more than 99% amylopectin.

Gas release agent: Vana-Cappa B01 ex FrieslandCampina Kievit (Meppel, The Netherlands). Ingredients of the powder are maltodextrin, modified starch (starch sodium octenyl succinate), and silica free flowing agent. Contains nitrogen gas under pressure, and the gas release is about 22 mL per gram dry agent upon dissolution in water.

Example 1 Suspending Air Bubbles in Instant Mushroom Soup with Xanthan Gum

To show the ability of hydrocolloids combined with gas release agent and flavour compound to suspend gas bubbles, the following experiments were carried out.

A powdered premix was made containing 10.0 g mushroom soup mix (mix 1 as in Table 1), 3.0 g gas release agent, and the required amount of hydrocolloid as indicated in Table 2, thoroughly mixed, and put into a 300 mL tall form glass beaker. 150.0 g of hot water, just after boiling, was added to the dry premix in one swift motion and the contents were vigorously stirred with a spoon for 30 sec. The volume of soup mix and water was 160 mL. Timing was started at the moment the water was poured. After stirring, the beaker was put on a stand and pictures were taken at preset time intervals.

TABLE 2

Hydrocolloids used and description of results, in soup mix 1 as in Table 1.

| Exp. | Hydro-colloid type | Hydro-colloid amount [g] | Aerated bulk liquid volume after 40 sec [mL] | Foam layer volume on top after 40 sec [mL] | Initial gas bubble volume in bulk liquid [mL] | Aerated bulk liquid volume after 5 min [mL] | Foam layer volume on top after 5 min [mL] |
|---|---|---|---|---|---|---|---|
| 1-1 | Keltrol AP-F | 0.2 | 218 | <10 | 58 | 208 | <10 |
| 1-2 | Keltrol AP-F | 0.4 | 212 | 5 | 52 | 202 | 5 |
| 1-3 | Keltrol AP | 0.2 | 203 | 5 | 43 | 150 | 50 |
| 1-4 | Keltrol AP | 0.4 | 203 | 5 | 43 | 200 | 6 |
| 1-5 | Keltrol RD | 0.2 | 153 | 53 | 0 | 153 | 44 |
| 1-6 | Keltrol RD | 0.4 | 152 | 49 | 0 | 152 | 45 |

An amount of 0.2 g hydrocolloid means that the concentration of the hydrocolloid is about 0.12% by weight of the prepared instant soups. The weight of the gas is not taken into account here. An amount of 0.4 g hydrocolloid means that the concentration of the hydrocolloid is about 0.24% by weight of the prepared instant soups. The concentration of native starch that is present in the dry soup mix 1 leads to a concentration of about 2.0% by weight of the of the prepared instant soups.

The required apparent yield stress for a spherical bubble having a diameter of 100 micrometer in the soup mix containing xanthan gum would be 0.35 Pa (calculated with equation 1), in order to keep the bubble dispersed. For a 200 micrometer bubble the required apparent yield stress would be 0.70 Pa.

In experiments 1-1, 1-2, and 1-4 there was no clear interface visible between a little foamy layer on top of the continuous liquid phase (bulk liquid) and the continuous liquid phase. In these experiments the used hydrocolloids provided the necessary yield stress sufficiently rapid in order to suspend the gas bubbles in the continuous liquid phase. The amount of foam layer on the top was negligible as compared to the total volume of the bulk liquid. In experiment 1-3 an interface was visible, showing a foam layer on top of the continuous liquid phase.

In experiments 1-5 and 1-6 a regular xanthan gum is used, as described in the prior art. This xanthan gum does not provide the yield stress as required to keep gas bubbles in the continuous liquid phase. A sharp cut interface between a foamy top layer and the continuous liquid phase was visible, and most gas bubbles were present in the foam layer on top.

The size of the gas bubbles in these samples was estimated to range from about 150 to 180 micrometer, as determined by bright field optical light microscope (Malvern Morphology G3).

FIG. 1 shows pictures of the instant soups of the experiments as listed in Table 2. All pictures were taken 58 or 60 seconds after adding water to the soup mix. These pictures show the difference in the amount of foam layer on top. Experiments 1-1, 1-2, and 1-4 do not show an interface at all, and the gas bubbles remain in the continuous liquid phase. Experiment 1-3 shows an interface which is not very sharp, with more foam on top of the continuous liquid phase than experiments 1-1, 1-2, and 1-4. Experiments 1-5 and 1-6 show a sharp interface, with a clear thick foam layer on top of the continuous liquid phase.

Example 2 Suspending Air Bubbles in Instant Mushroom Soup with Modified and Native Starches Similar experiments as in Example 1 were done in order to determine the effect of various starch types on the dispersion of gas bubbles.

A powdered premix was made containing 10.0 g mushroom soup mix (mix 1 as in Table 1), 3.0 g gas release agent, and the required amount of hydrocolloid as indicated in Table 3, thoroughly mixed, and put into a 300 mL tall form glass beaker. 150.0 g of hot water, just after boiling, was added to the dry premix in one swift motion and the contents was vigorously stirred with a spoon for 30 sec. The volume of soup mix and water was 170 mL. Timing started at the moment the water was poured. After stirring, the beaker was put on a stand and pictures are taken at preset time intervals.

TABLE 3

Starches used and description of results, in soup mix 1 as in Table 1.

| Exp. | Hydro-colloid type | Hydro-colloid amount [g] | Aerated bulk liquid volume after 40 sec [mL] | Foam layer volume on top after 40 sec [mL] | Initial gas bubble volume in bulk liquid [mL] | Aerated bulk liquid volume after 5 min [mL] | Foam layer volume on top after 5 min [mL] |
|---|---|---|---|---|---|---|---|
| 2-1 | Prejel VA70 | 4.0 | 209 | 5 | 39 | 201 | 8 |
| 2-2 | Eliane SC160 | 4.0 | 212 | 7 | 42 | 200 | 8 |
| 2-3 | Native starch* | 4.0 | 205 | 7 | 35 | 199 | 7 |

*native starch: Native Potato Starch Granulated as in Table 1.

A concentration of 4 g of hydrocolloid means that the concentration of the hydrocolloid is about 2.4% by weight of the prepared instant soups. The weight of the gas is not taken into account here. The concentration of native starch that is present in the dry soup mix 1 leads to a concentration of about 2.0% by weight of the of the prepared instant soups. So in experiment 2-3 the total concentration of native starch is about 4.4% by weight.

Also in these experiments the size of the gas bubbles in these samples was estimated to range from about 150 to 180 micrometer, as determined by bright field optical light microscope (Malvern Morphology G3).

The required apparent yield stress for a spherical bubble having a diameter of 100 micrometer in the soup mix containing xanthan gum would be 0.35 Pa (calculated with equation 1), in order to keep the bubble dispersed. For a 200 micrometer bubble the required apparent yield stress would be 0.71 Pa.

Experiments 2-1 and 2-2 showed that the effect of 4.0 g of Prejel or Eliane modified starches had a similar effect as xanthan gums Keltrol AP and AP-F, although in much higher amounts (4.0 g starch vs. 0.2 g Keltrol AP-F). The amount of modified starch that is required is 20 times higher than the amount of Keltrol AP-F, in order to obtain the same effect. Gas bubbles were dispersed in the liquid soup.

Experiment 2-3 with native starch shows the same behaviour as experiments 2-1 and 2-2. Gas bubbles were suspended in the liquid, and the effect of the addition of 4.0 g native starch in these compositions is the same as 4.0 g of the modified starches. Therefore the native starches do not provide a benefit over the native starch.

Subsequently another set of experiments was done with a soup mix which did not contain native starch (mix 2 in Table 1). The dry soup mix of mix 2 is the same as mix 1, with the difference that mix 2 does not contain the native starches. A powdered premix is made containing 7.0 g mushroom soup mix (mix 2 as in Table 1), 3.0 g gas release agent, and the required amount of hydrocolloid as indicated in Table 4, thoroughly mixed, and put into a 300 mL tall form glass beaker. 150.0 g of hot water, just after boiling, is added to the dry premix in one swift motion and the content is vigorously stirred with a spoon for 30 sec. The volume of soup mix and water was about 166 mL. Time is started at the moment the water is poured. After stirring, the beaker is put on a stand and pictures are taken at preset time intervals.

the continuous liquid phase. Experiment 2-6 shows that within 40 seconds a foam layer on top of the liquid was formed. Experiment 2-7 shows a behaviour which is similar, at a longer time scale though. The gas bubbles cream to the top within 2 minutes after the preparation of the soup. In experiment 2-8 a foam layer slowly developed. In experiment 2-9 0.5 g of Keltrol AP-F was added, and in that case bubbles did not cream to the top of the instant soup, even 30 minutes after the soup preparation. FIG. 3 shows pictures of soup samples, taken about 40 seconds after the addition of water to the dry mixes.

When comparing experiments 2-9 and 1-1, the following can be observed. In experiment 1-1 the dry soup mix as added to the glass beaker contains about 3 g of native starch. In that case 0.2 g Keltrol AP-F is sufficient to keep the gas bubbles dispersed in the continuous liquid phase. In case no native starch is present, then 0.5 g Keltrol AP-F is required to obtain the same effect. Therefore it appears that 0.3 g Keltrol AP-F has the same functionality of 3 g of native starch, in order to keep the gas bubbles dispersed. Therefore the amount of hydrocolloid that is required is much lower than the hydriocolloids of the prior art.

Example 3 Qualitative Determination of Yield Stress Under Dynamic Conditions In this experiment model solutions have been prepared containing the relevant hydrocolloid (either 0.2 g, 0.4 g, or 4 g), together with icing sugar (sucrose, 5.0 gram) and erythritol (2.0 g) to prevent lumping of the dry hydrocolloid. The premix was dry mixed well, and subsequently put into a tall form 300 ml glass beaker.

TABLE 4

Starches used and description of results, in soup mix 2 as in Table 1 (without native starch).

| Exp. | Hydrocolloid type | Hydrocolloid amount [g] | Aerated bulk liquid volume after 40 sec [mL] | Foam layer volume on top after 40 sec [mL] | Initial gas bubble volume in bulk liquid [mL] | Aerated bulk liquid volume after 5 min [mL] | Foam layer volume on top after 5 min [mL] |
|---|---|---|---|---|---|---|---|
| 2-4 | Prejel VA70 | 4.0 | 170 | 25 | 4 | 168 | 19 |
| 2-5 | Eliane SC160 | 4.0 | 167 | 35 | 1 | 167 | 20 |
| 2-6 | Keltrol AP-F | 0.2 | 155 | 37 | 0 | 152 | 33 |
| 2-7 | Keltrol AP-F | 0.3 | 195 | 10 | 35 | 155 | 41 |
| 2-8 | Keltrol AP-F | 0.4 | 195 | 6 | 35 | 166 | 24 |
| 2-9 | Keltrol AP-F | 0.5 | 200 | 0 | 40 | 188 | 3 |

In experiment 2-4, the total volume of the liquid was lower than in experiment 2-1. After 30 seconds a clear interface between a foam layer on top of the liquid soup and the continuous liquid phase (bulk liquid) was observed. This shows that using 4.0 g of Prejel without native starch in the dry soup mix was not sufficient to keep the gas bubbles in the continuous liquid phase. Similarly in experiment 2-5 a relatively thick foam layer was formed using 4.0 g of Eliane without native starch. Therefore also using 4.0 g of Prejel without native starch in the dry soup mix was not sufficient to keep the gas bubbles in the continuous liquid phase. The differences between the experiments 2-1, 2-2, and 2-3 on the one hand and 2-4 and 2-5 on the other hand are shown in FIG. 2. The pictures in this figure are made about 30 seconds after addition of hot water to the soup mix.

The experiments 2-6, 2-7, 2-8, and 2-9 with Keltrol AP-F show that this type of xanthan gum does not require the presence of native starch, in order to keep the gas bubbles in Three different types of precision plastic spheres (The Precision Plastic Ball Company Ltd., UK) are added to the premix in the beaker. These spheres are:

- high density polyethylene (HDPE) spheres, diameter of 3.17 mm coloured green, density of 0.952 $g \cdot cm^{-3}$,
- high density polyethylene (HDPE) spheres, diameter of 5.69 mm coloured bright red, density of 0.952 $g \cdot cm^{-3}$,
- polystyrene (PS) sphere, diameter of 4.76 mm, coloured dark red, density 1.04 $g \cdot cm^{-3}$.

The size and density of the spheres was chosen in such a way that they would behave like gas bubbles of approximately 0.1 mm (4.76 mm PS sphere), 0.2 mm (3.17 mm HDPE sphere), and 0.3 mm (5.69 mm HDPE sphere). The differences to bubbles are that the terminal velocity of the probe spheres will be an order of magnitude bigger in a Newtonian fluid and that the PS sphere is going to sediment instead of cream.

For the experiments with xanthan gums, 150 g of water at ambient temperature was poured on top of a dry premix and was vigorously manually stirred with a metal spoon for 30 seconds. The density of the final solutions was (1.014±0.001) g·cm$^{-3}$ at 20° C. Xanthan gum's behaviour is independent of the water temperature.

Equation 1 can be written for these spheres as:

$$\tau \geq \frac{(\rho_l - \rho_{pp})gD_{pp}}{2\sqrt{2}}, \quad (2)$$

Where $\rho_{pp}$ is the density of the probe particle, and $D_{pp}$ is the probe particle diameter.

In the following table the critical yield stress for the three probe particles used in these dynamic yield stress measurements is given together with the equivalent bubble diameter in the respective model solutions, calculated with densities at 20° C. The probed yield stress depends on the particle size, particle density and the density of the model solution. With the three probe particles we cover more or less the range of apparent yield stress that would immobilize bubbles with diameters ranging from about 100 to 400 micrometer.

TABLE 5

Critical yield stress for the three probe particles, together with the equivalent bubble diameter in the respective model solutions.

| Particle material | $D_{pp}$ [mm] | $\rho_{pp}$ [kg·m$^{-3}$] | τ [Pa] in xanthan gum solution | τ [Pa] in starch solution | Equivalent $D_b$ [mm] in xanthan gum solution | Equivalent $D_b$ [mm] in starch solution |
|---|---|---|---|---|---|---|
| HDPE | 3.17 | 952.0 | 0.68 | 0.78 | 0.19 | 0.22 |
| HDPE | 5.69 | 952.0 | 1.22 | 1.40 | 0.35 | 0.40 |
| PS | 4.76 | 1040.0 | 0.43 | 0.28 | 0.12 | 0.08 |

For the experiments with modified starches, 150 g of hot water (just after boiling) was poured on top of the premix and is vigorously stirred by hand with a metal spoon for 30 seconds. Here hot water is used, in order to gelatinise the starch and make it functional. The density of the final solutions was (1.023±0.001) g·cm$^{-3}$ at 20° C.

After the stirring the spheres were suspended at a certain height in the liquid, and depending of the yield stress generated by the hydrocolloid, they would slowly move upward, or downward, or they would remain at its place. The higher the yield stress, the slower the spheres would move. The beaker was positioned on a stand and pictures were taken at fixed time intervals for 5 minutes. This way the movement of the spheres could be followed in time. The translation of the spheres relative to its starting position can be plotted as function of time in a graph. In case the processes are too fast to be captured on pictures, a video record was made instead. If there is no yield stress in the system, the spheres will move with a constant velocity through the liquid. If sufficient yield stress is developed by the time the picture taking will have commenced the spheres will stay motionless. If yield stress is developing during the time of the experiments, the spheres' motion is going to be decelerative, i.e. they will slow down and eventually stop moving. The trajectories of the spheres in the experiments described above are measure using video imaging software ImageJ. As a result we get the translation of each type of sphere with time in the studied system.

The following experiments were performed.

TABLE 6

Description of experiments with precision spheres.

| Exp. | Hydrocolloid type | Hydrocolloid amount [g] | Hydrocolloid concentration* [wt %] |
|---|---|---|---|
| 3-1 | Keltrol AP-F | 0.2 | 0.13 |
| 3-2 | Keltrol AP-F | 0.4 | 0.25 |
| 3-3 | Keltrol AP | 0.2 | 0.13 |
| 3-4 | Keltrol AP | 0.4 | 0.25 |
| 3-5 | Keltrol RD | 0.2 | 0.13 |
| 3-6 | Keltrol RD | 0.4 | 0.25 |
| 3-7 | Prejel VA70 | 4.0 | 2.5 |
| 3-8 | Eliane SC160 | 4.0 | 2.5 |

*corrected for the icing sugar and erythritol

Figure 4:
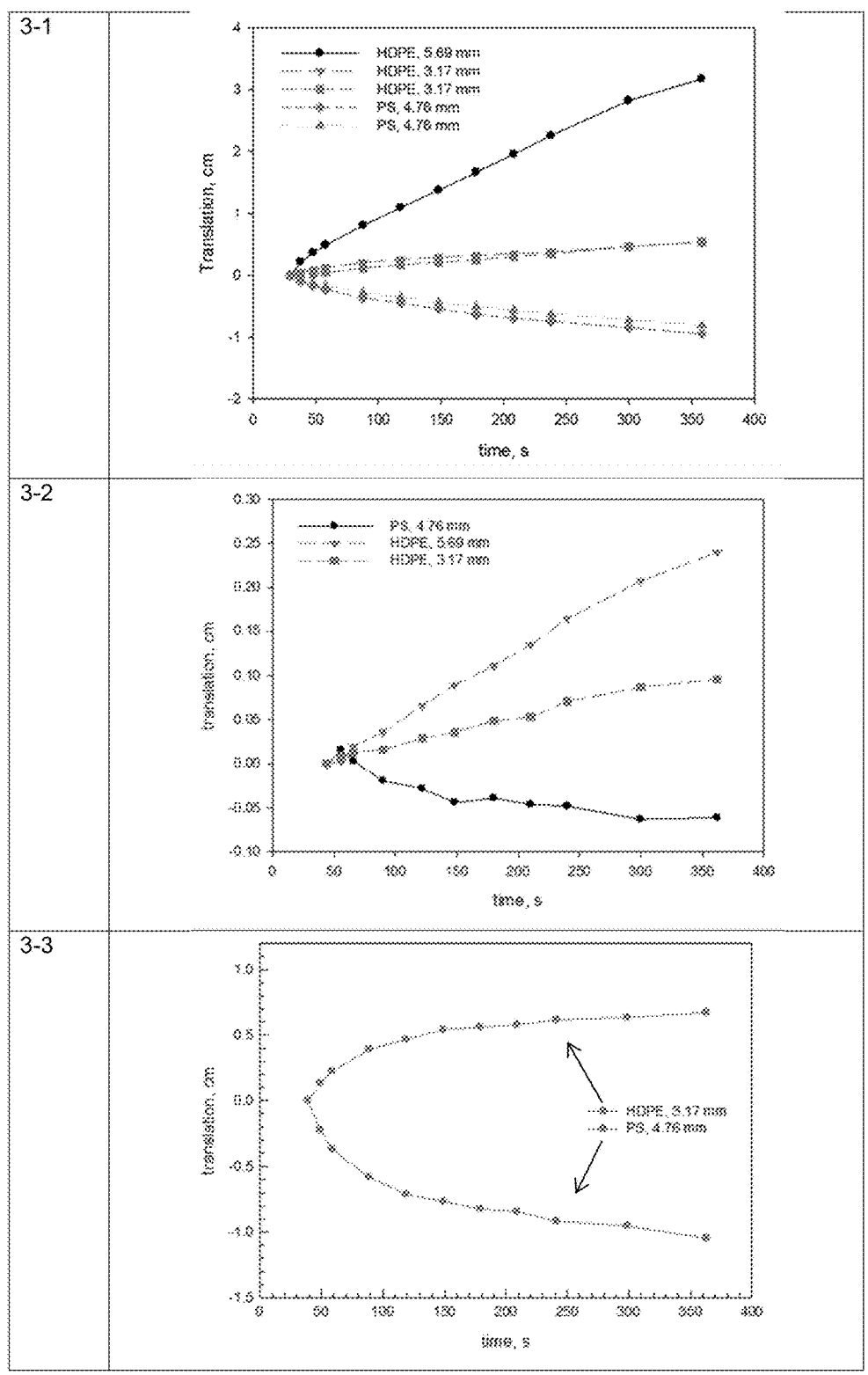
FIG. 4 Graphs showing translation of precision spheres as function of time, experiments from Example 3.
- 3-1: ●HDPE 5.69 mm, ▼HDPE 3.17 mm; ■HDPE 3.17 mm; ◇PS 4.76 mm; ▲PS 4.76 mm.
- 3-2: ●PS 4.76 mm; ▼HDPE 5.69 mm; ■HDPE 3.17 mm.
- 3-3: ●HDPE 3.17 mm (upper curve); ●PS 4.76 mm (lower curve).
Figure 5:
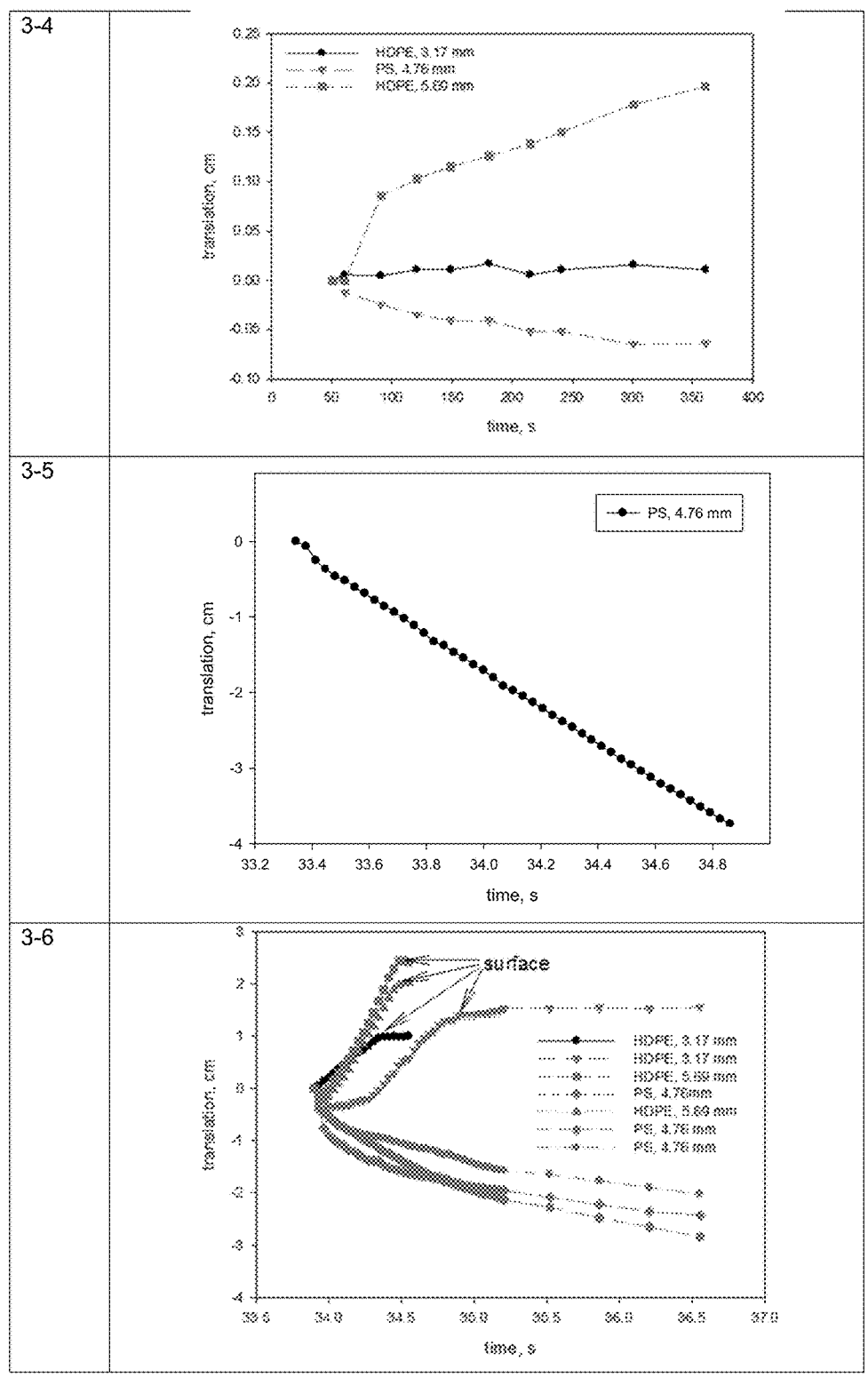
FIG. 5 Graphs showing translation of precision spheres as function of time, experiments from Example 3.
- 3-4: ●HDPE 3.17 mm; ▼PS 4.76 mm; ■HDPE 5.69 mm.
- 3-5: ●PS 4.76 mm.
- 3-6: ●HDPE 3.17 mm, ▼HDPE 3.17 mm; ■HDPE 5.69 mm; ◇PS 4.76 mm; ▲HDPE 5.69 mm; ✱PS 4.76 mm; ●PS 4.76 mm.

The movement of the spheres in each experiment has been plotted in various graphs in FIG. 4 and FIG. 5. In some cases duplicate measurements are shown, wherein two similar spheres are followed. In general reproducibility is very good, as the trajectories of these two spheres almost coincide.

In experiment 3-1 the largest sphere translates the most from its initial position, as compared to the other spheres. The smaller spheres only have a small translation.

In experiment 3-2 the concentration of hydrocolloid has doubled, and the spheres nearly do not move. The maximum measured translation is about 0.25 cm. This shows that the yield stress in this system is high enough to suspend the spheres.

In experiment 3-3 the yield stress did not develop rapidly enough to keep the largest sphere suspended, this sphere floated to the surface. The smaller spheres initially show a relatively rapid movement, which then decelerates because of the development of sufficient yield stress to keep the small spheres suspended.

In experiment 3-4 the translation was very small, like in experiment 3-2. The yield stress that develops This shows that the yield stress in this system is high enough to suspend the spheres.

In experiment 3-5 the behaviour of the spheres is different than in the previous experiments. The HDPE spheres rapidly moved to the surface of the liquid, and the PS sphere sedimented within 2 seconds. This is shown in FIG. 5, where the translation of the particle lies on a straight line with a constant slope. This is indicative of typical Newtonian fluid rheology. Keltrol RD does not have any effect on dissolution or yield stress development.

In experiment 3-6 the spheres show similar behaviour as in experiment 3-5, although the time scale is different. the HDPE particles initially accelerate, and after that move with constant velocities until they surface. This is a typical behaviour of probe particles in Newtonian fluid, and this shows that the presence of Keltrol RD in the solution does not lead to the development of yield stress large enough to oppose the buoyancy force acting on the HDPE particles. The PS particles show different behaviour: they initially decelerate and then move at constant velocities. The initial deceleration might be due to the nature of the experiment. In this case the PS particle were thrown into the solution after the video recording had started, i.e. they had some initial non zero velocity when they contacted the solution. Therefore, they decelerated due to the viscous drag of the solution. After the initial period of time all three PS particles moved with the same constant velocity during the time of the measurement, showing the same Newtonian behaviour of the surrounding solution.

Figure 6:
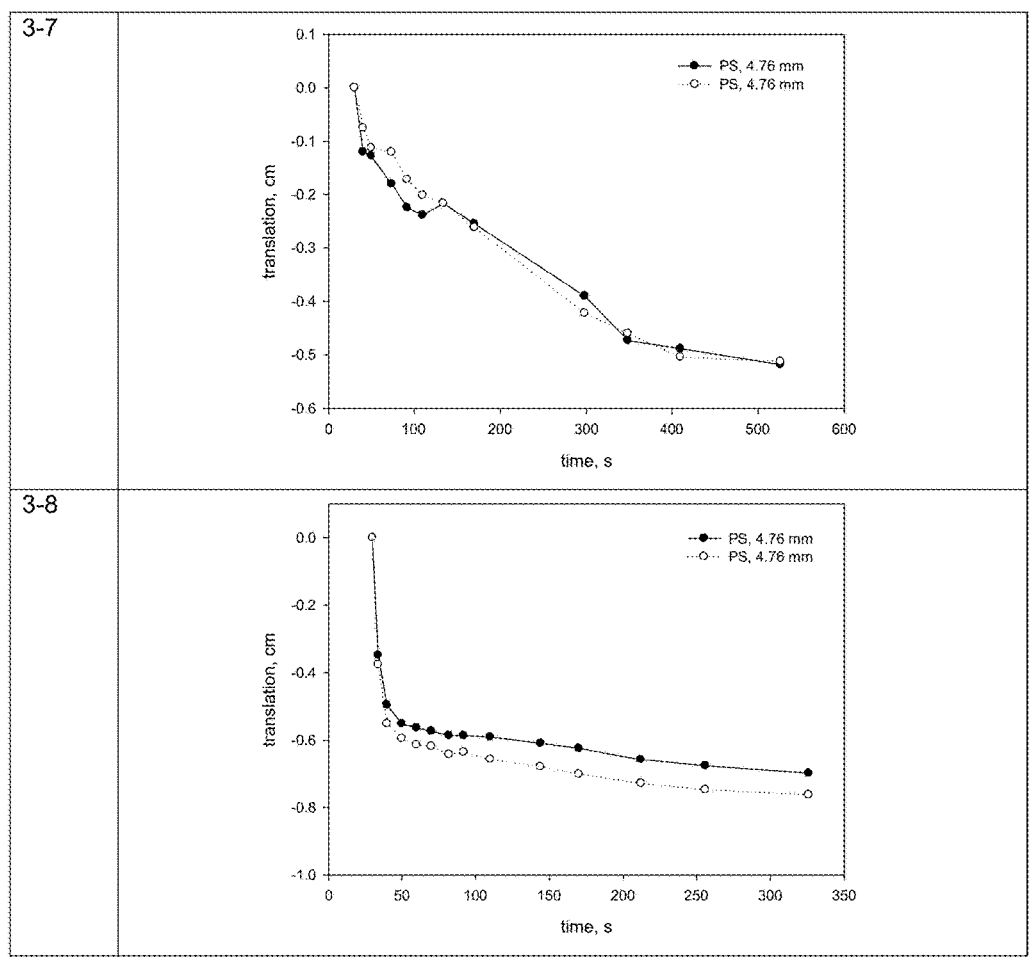
FIG. 6: Graphs showing translation of precision spheres as function of time, experiments from Example 3.

In experiment 3-7 the HDPE spheres rapidly moved to the surface of the liquid, while the PS spheres only showed limited movement, as shown in FIG. 6 (duplicate measurement). The yield stress was sufficient to suspend the PS spheres.

Also in experiment 3-8 similar behaviour of the spheres was observed. The HDPE spheres rapidly moved to the surface, while the PS spheres remained suspended during the experiment, see FIG. 6 (duplicate measurement).

Therefore the amount of modified starch used to keep spheres suspended in the continuous liquid phase, is much higher concentration than the xanthan gums Keltrol AP and Keltrol AP-F. The amounts of Keltrol AP or Keltrol AP-F are 10 to 20 times lower than the amounts of modified starches to obtain the same effect.

Example 4 Preparation of Aerated Milk Tea

Lipton 5 Bean Milk Tea (ex Unilever China, Shanghai, China) instant milk tea powder was used to prepare milk tea. The dry powder is individually packed in sachets, each containing in total 21.7 g of tea extract and milk powder. The amount of milk protein in a prepared milk tea in a cup is more than 0.5%, when following the instructions on pack.

Figure 7:
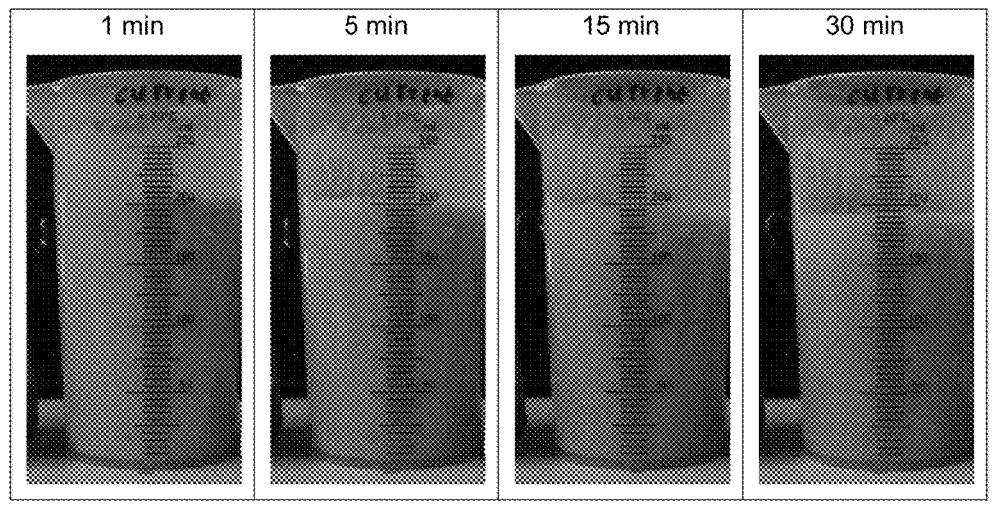
FIG. 7 Pictures of aerated milk tea sample, from Example 4. Pictures taken 1, 5, 15 and 30 minutes, respectively, after adding water to the dry mix.

A sachet was taken and added to an empty cup; this was mixed with 0.3 g xanthan gum Keltrol AP-F, and 2.0 g of gas release agent Vana Cappa B01. 150 g of water just after boiling was added, and the preparation was manually stirred. This resulted in gas bubbles dispersed in the continuous aqueous phase, as is shown in FIG. 7. No foam layer on the top formed, and the total volume of the aerated milk tea decreased only very slowly during a period of 30 minutes.

Example 5 Preparation of Aerated Soy Beverage

An aerated soy drink was prepared, by blending 2.0 g of gas release agent Vana Cappa B01, 0.3 g xanthan gum Keltrol AP-F, and 14.0 g of a spray dried soy milk. This aerated soy beverage was prepared as a proof of principle. Therefore the spray dried soy milk drink that was used, had the same composition and the same spray drying process was applied as described in O. Syll et al. (Dairy Sci. & Technol. (2013) 93:431-442).

Soy supreme fiber reduced with 45% w/w total protein (ex SunOpta Grains and Food Group, St. Hope, Minn., USA) was used to prepare the soy milk to be spray dried. This soy powder was combined with maltodextrin (dextrose equivalent 17, ex Glucidex Roquette, France). The soy protein amount in this mixture was 30% of the total amount of solids. The soy milk was prepared by dissolving the mixture of soy powder and maltodextrin. The total solids concentration in the soy milk was 20 wt %. After spray drying, the dry soy powder-maltodextrin mixture was used to blend with the gas release agent and the xanthan gum.

Figure 8:
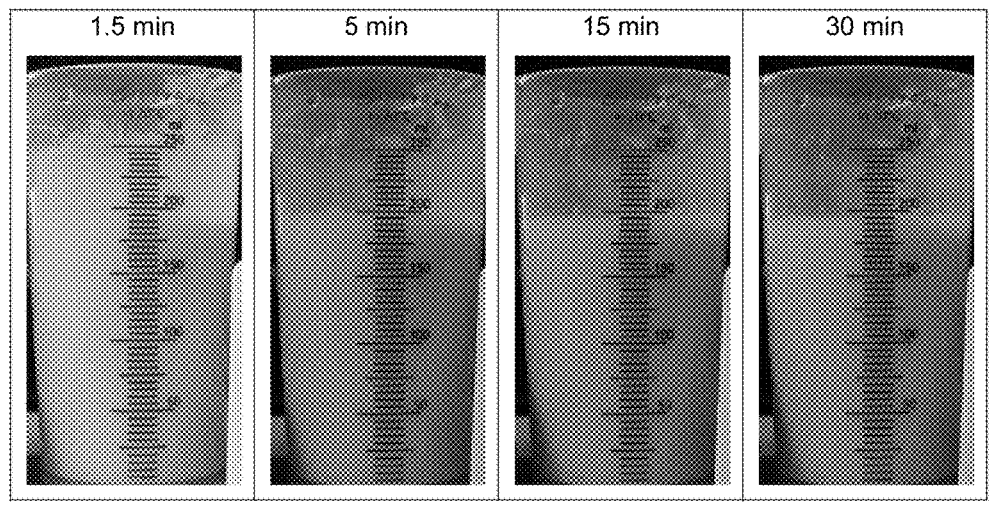
FIG. 8 Pictures of aerated soy milk sample, from Example 5. Pictures taken 1.5, 5, 15, and 30 minutes, respectively, after adding water to the dry mix.

150 g water at ambient temperature was added to this dry mixture, and the preparation was manually stirred. This resulted in gas bubbles dispersed in the continuous aqueous phase, as is shown in FIG. 8. No foam layer on the top formed, and the total volume of the aerated soy drink decreased only very slowly during a period of 30 minutes.

The invention claimed is:

1. A composition in the form of a dry mixture in particulate form for preparation of a liquid food composition containing dispersed gas bubbles in a continuous liquid phase, the dry mixture in particulate form comprising:
   an instant flavour component in particulate form;
   a water-soluble gas release agent in particulate form that releases gas bubbles upon reconstitution in water; and
   a hydrocolloid in particulate form that provides an apparent yield stress of at least 0.3 Pa within a period of 30 seconds after the addition of water to reconstitute the hydrocolloid, wherein the hydrocolloid is present in the composition at a weight fraction of at least 1.0 wt %;
   wherein:
   the instant flavour component is suitable to prepare ice cream and/or desserts and/or milk shakes, which are intended for serving at a temperature below 0° C.; and
   the hydrocolloid comprises xanthan gum obtained from the fermentation of *Xanthomonas campestris*, deposited with the American Type Culture Collection (ATCC) under the accession no. PTA-11272.

2. The composition according to claim 1, wherein the hydrocolloid provides an apparent yield stress of at least 0.3 Pa within a period of 15 seconds after the addition of water to reconstitute the hydrocolloid.

3. The composition according to claim 1, wherein the hydrocolloid provides an apparent yield stress of at least 0.5 Pa within a period of 30 seconds after the addition of water to reconstitute the hydrocolloid.

4. The composition according to claim 1, wherein the hydrocolloid has a hydration rate in water at a temperature of 23° C. at a concentration of 1 wt % and a volume weighted mean diameter D4.3 of the hydrocolloid ranging from 40 to 200 micrometer, of less than 3 minutes.

5. The composition according to claim 1, wherein the hydrocolloid comprises a xanthan gum, having the following properties in solution at 23±2° C.:
   a hydration rate of less than 3 minutes in a 1 wt % NaCl solution at a 1 wt % concentration of xanthan gum; and
   an ability to fully hydrate in less than 10 minutes in a 6 wt % NaCl solution at a 1 wt % concentration of xanthan gum.

6. The composition according to claim 2, wherein the composition comprises one or more native starches.

7. The composition according to claim 1, wherein the dry mixture in particulate form comprises pregelatinised starch or pregelatinised modified starch at a concentration of less than 0.5 wt %, based on dry weight.

8. A method for preparation of ice cream and/or desserts and/or milk shakes, comprising bringing a composition according to claim 1 into contact with water.

9. The method according to claim 8, wherein the weight ratio between dry mixture in particulate form and water ranges from 1:100 to 1:1.

10. The method according to claim 8, wherein the temperature of the water ranges from 0° C. to 25° C.

11. An ice cream and/or dessert and/or milk shake composition in the form of a liquid food product containing gas bubbles in the continuous liquid phase, obtainable by the method according to claim 8.

12. The composition according to claim 11, wherein after reconstitution a composition is obtained which maintains gas bubbles throughout the continuous liquid phase of the product for at least 10 minutes.

13. The composition according to claim 11, wherein after reconstitution, the gas bubbles constitute from 1% to 50% of the volume of the dispersion.

14. The composition according to claim 11, wherein at least 90% of the gas volume directly after reconstitution is formed by gas bubbles having a diameter of 200 micrometer or less.

15. The composition according to claim 1, wherein the water-soluble gas release agent comprises particles containing pressurized gas.

16. The composition according to claim 1, wherein the weight fraction of the hydrocolloid in the composition is from 1.0 wt % to 4.0 wt %.

* * * * *